United States Patent [19]
Murakami et al.

[11] Patent Number: 5,570,368
[45] Date of Patent: Oct. 29, 1996

[54] CELL MULTIPLEXER HAVING CELL DELINEATION FUNCTION

[75] Inventors: Masaru Murakami; Yozo Oguri; Yoshihiro Ashi, all of Yokohama; Katsuyoshi Tanaka, Tokyo; Takahiko Kozaki, Koganei; Akihiko Takase, Tokyo; Morihito Miyagi, Kodaira, all of Japan

[73] Assignee: Hitachi, Ltd., Tokyo, Japan

[21] Appl. No.: 409,691

[22] Filed: Mar. 24, 1995

[30] Foreign Application Priority Data

Mar. 31, 1994 [JP] Japan ................................. 6-062387

[51] Int. Cl.$^6$ .................................................. H04L 12/56
[52] U.S. Cl. ........................................ 370/94.2; 370/112
[58] Field of Search .................................. 370/94.1, 94.2, 370/94.3, 60, 60.1, 100.1, 110.1, 105.1, 105.4, 112, 61, 85.6; 340/825.5, 825.51, 825.52; 371/37.1, 37.2, 37.3, 37.7, 39.1, 42, 46; 375/354, 355, 356, 359, 365, 366

[56] References Cited

U.S. PATENT DOCUMENTS 4,603,416 7/1986 Servel et al. .......................... 370/60
4,947,388 8/1990 Kuwahara et al. ...................... 370/60

*Primary Examiner*—Benedict V. Safourek
*Assistant Examiner*—Dang Ton
*Attorney, Agent, or Firm*—Antonelli, Terry, Stout & Kraus

[57] ABSTRACT

A cell multiplexer includes a multiplexing unit for time-divisionally multiplexing ATM cell signals given from a plurality of input lines, a write controller for storing cell signals outputted from the multiplexing unit in a buffer memory successively correspondingly to the input lines, a read controller for reading the cell signals stored in the buffer memory from the buffer memory in the form of data blocks synchronized with an ATM cell structure, and a cell delineation controller for detecting delineation states of the data blocks read out from the buffer memory, notifying the read controller of delineation control information corresponding to a result of the detection and transmitting data blocks read out in synchronism with a predetermined cell structure to the output line selectively, wherein the read controller determines the read beginning addresses of data blocks to be read out nextly correspondingly to the input lines on the basis of the delineation control information notified by the cell delineation controller.

37 Claims, 19 Drawing Sheets

FIG. 7

| PERIOD OF READ DATA LENGTH COUNTER | | METHOD 1 | METHOD 2 | METHOD 3 |
|---|---|---|---|---|
| | HUNT: S11 | 53 | 53 | 57 |
| | PRESYNCH: S12 | 53 | 49 | 53 |
| READ ADDRESS DISPLACEMENT (BYTE) | | h+53 | h+53 | h−m+53 |
| | SYNCH: S13 | 53 | 53 | 53 |

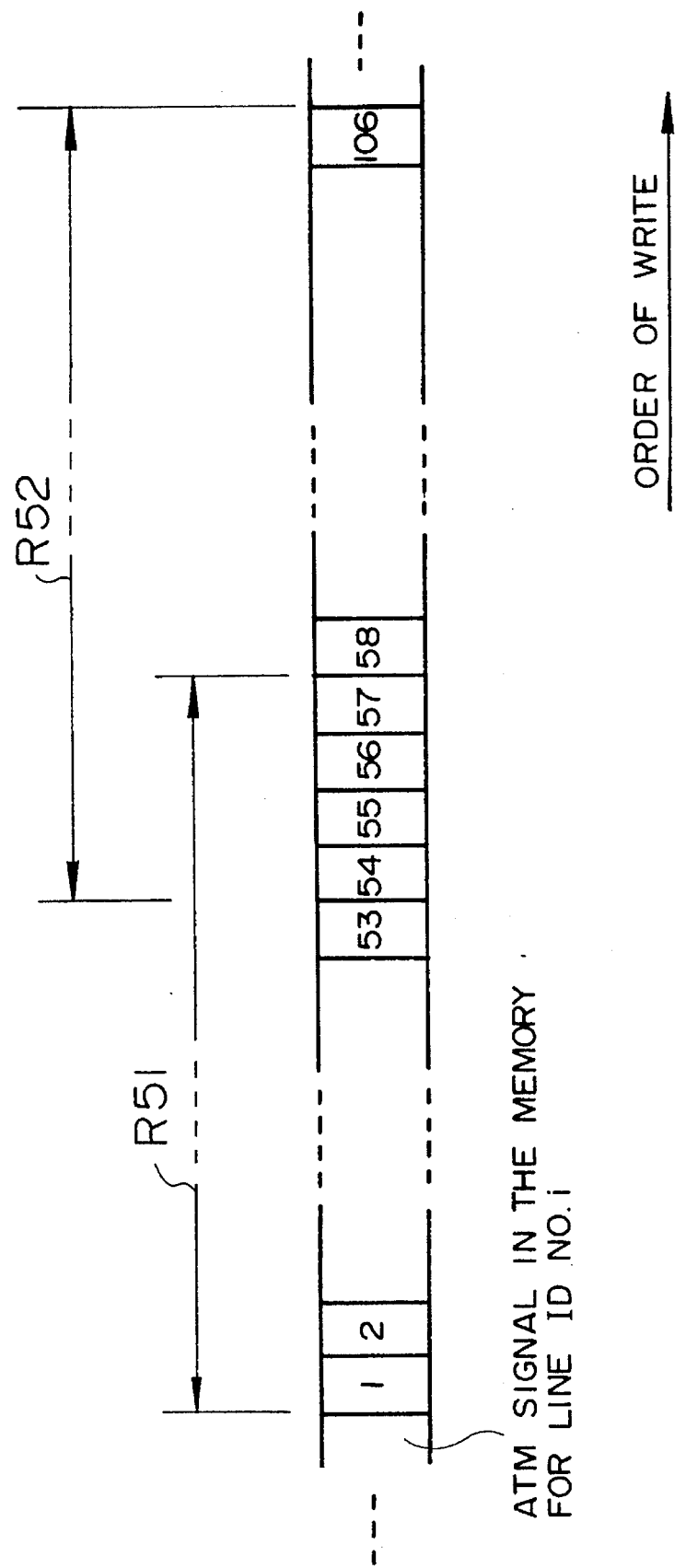

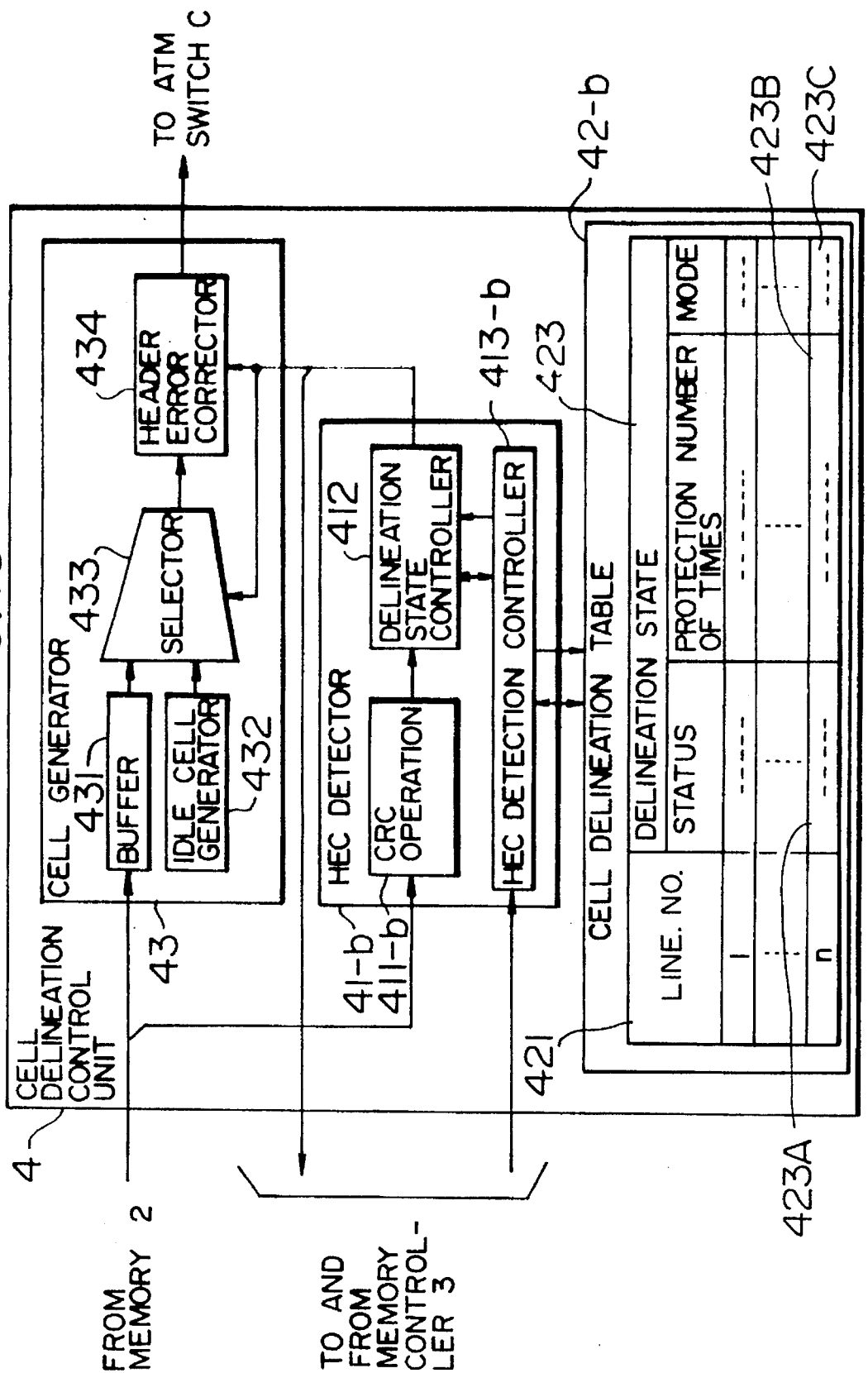

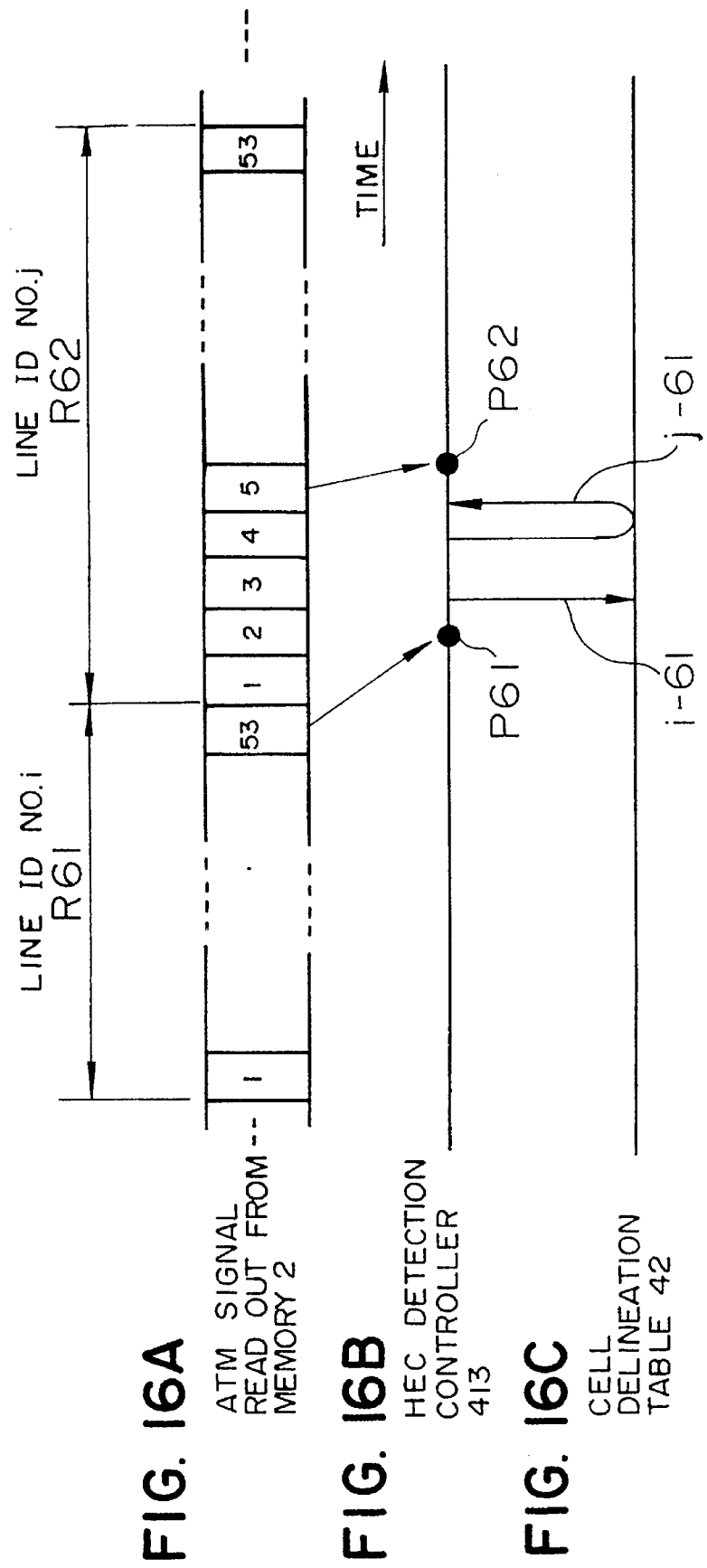

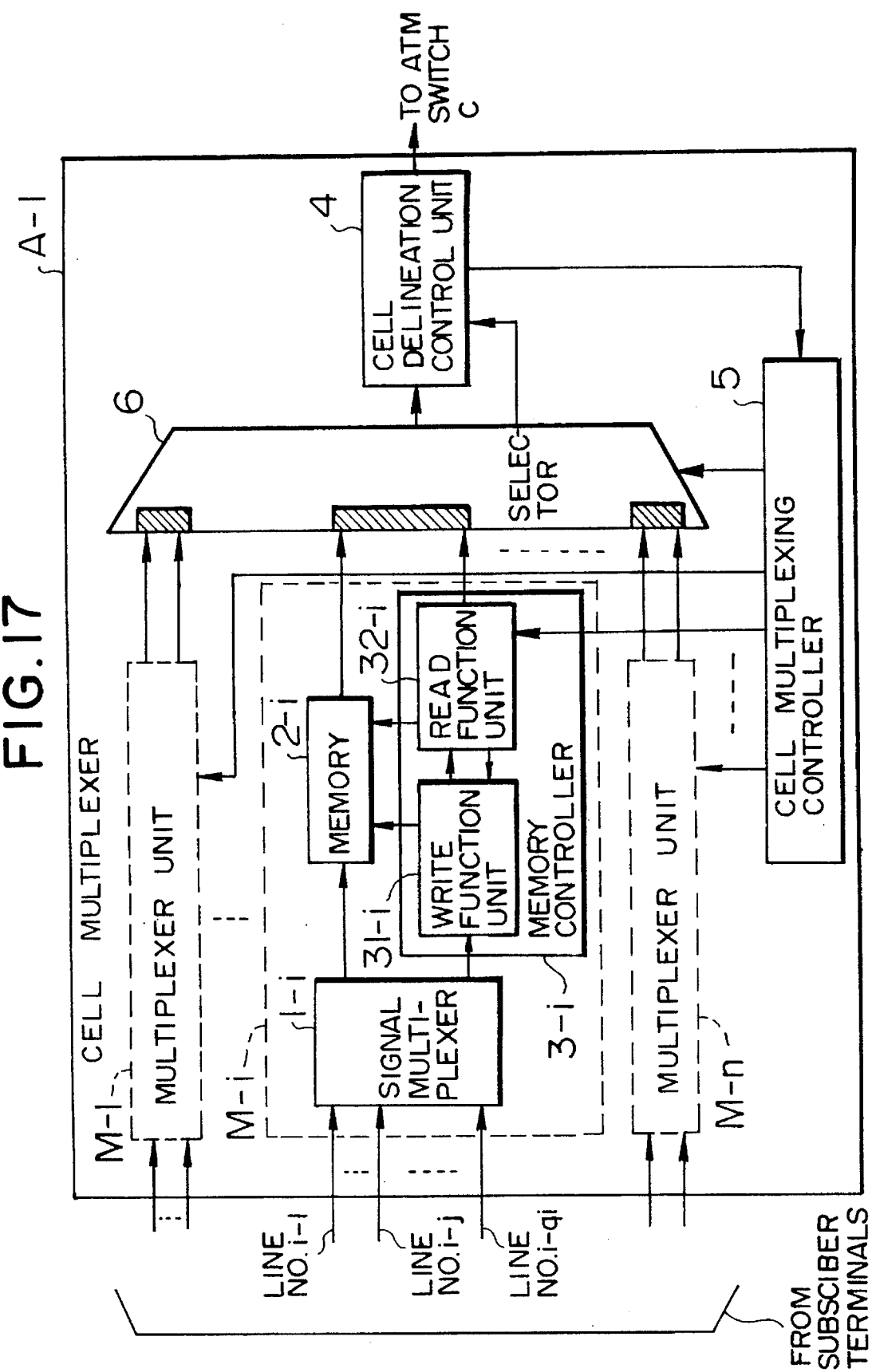

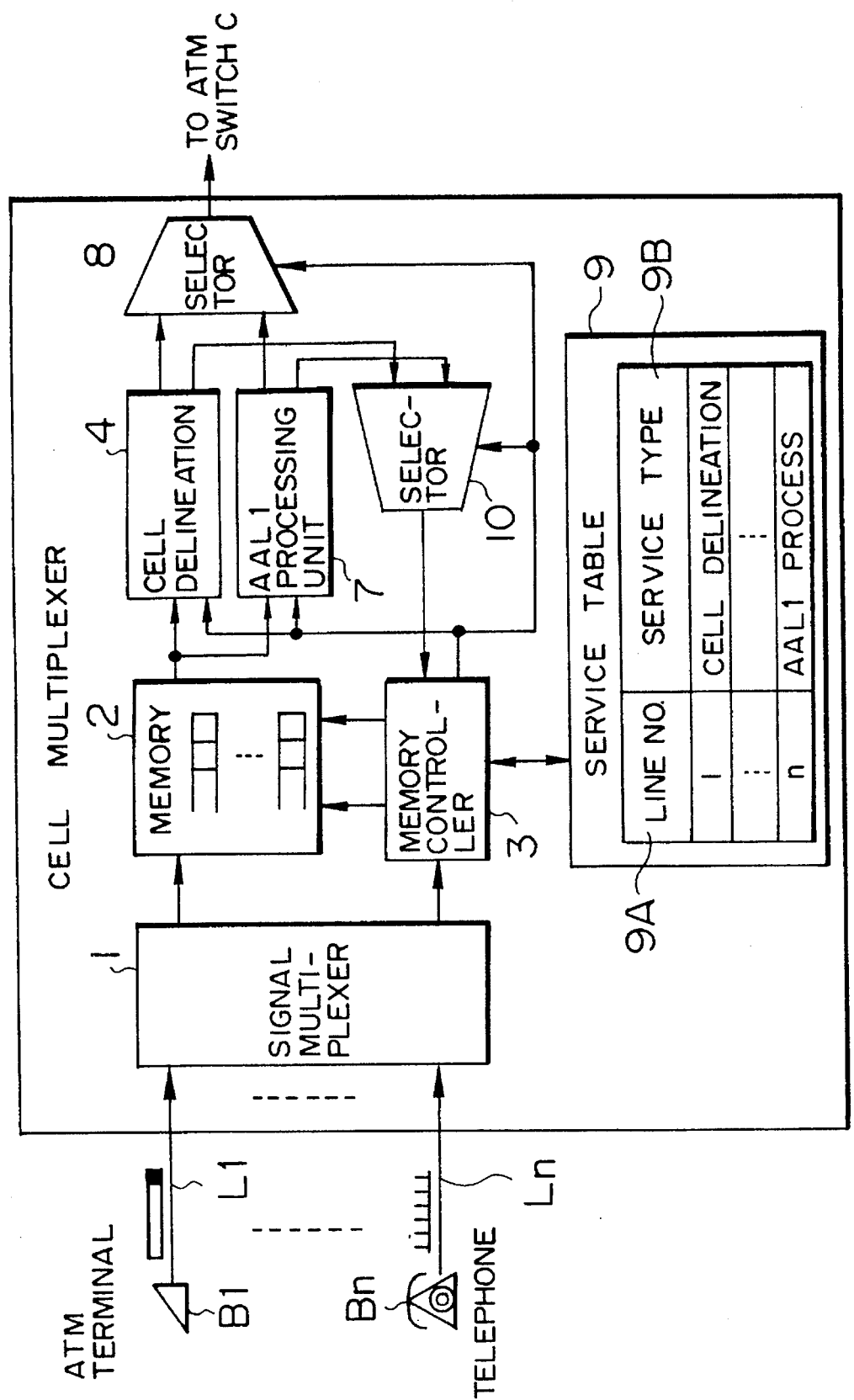

CELL MULTIPLEXER HAVING CELL DELINEATION FUNCTION

BACKGROUND OF THE INVENTION

The present invention relates to a cell multiplexer and particularly relates to a cell multiplexer having a "cell delineation" function in which: relatively low-bit-rate fixed-length packets (cells) of an asynchronous transfer mode (hereinafter referred to as "ATM") received from subscriber lines are stored in a buffer memory; and boundaries between cells are identified so that correct data blocks thus read are transmitted to an output line.

As a conventional cell multiplexer, there is known a structure having cell delineation circuits corresponding to respective lines for performing cell multiplexing after cell synchronization, for example, as disclosed in "Discussion of A Header Error Check Calculation Circuit" reported in the Institute of Electronics, Information and Communication Engineers, 1990 Spring National Conference, Japan.

According to the conventional structure, however, one cell delineation circuit can process a signal in only one input line, so that a plurality of cell delineation circuits are required correspondingly to respective input lines even in the case where the transmission bit rate in the lines is low. For example, in the case of a system in which input line signals transmitted at the bit rate of about 6.3 mega-bits per second are transmitted to the ATM switch side while 21 input lines are multiplexed, 21 cell delineation circuits are required. In addition, the conventional structure requires memories for storing cell signals correspondingly to respective lines for the purpose of cell multiplexing, so that the hardware size thereof becomes large.

SUMMARY OF THE INVENTION

An object of the present invention is to provide a cell multiplexer in which cell signal outputs can be controlled so that the head of each of data blocks given to an output line coincides with the head of a corresponding cell.

Another object of the present invention is to provide a cell multiplexer in which a buffer memory for storing input cells temporarily and a read/write control means can be used to be common to a plurality of input lines so that data blocks subjected to cell delineation are read out to an output line.

A further object of the present invention is to provide a cell multiplexer which is formed so that a cell delineation control means can be used so as to be common to a plurality of lines.

To achieve the foregoing objects, according to an aspect of the present invention, the cell multiplexer, in which fixed-length cell signals given in parallel from a plurality of input lines are stored in a buffer memory temporarily and then sent out to an output line in the form of data blocks synchronized with a predetermined cell structure, comprises a multiplexing means for multiplexing cell signals received from a plurality of input lines, a write control means for storing cell signals outputted from the multiplexing means in the buffer memory successively, a read control means for reading the cell signals stored in the buffer memory in the form of data blocks each constituted by a predetermined number of bytes correspondingly to the input lines, and a cell delineation control means for detecting the delineation state of each of the data blocks read from the buffer memory, notifying the read control means of delineation control information in accordance with a result of the detection and transmitting data blocks synchronized with the predetermined cell structure to an output line selectively, and wherein the read control means determines the read beginning addresses of data blocks to be read nextly correspondingly to the respective input lines on the basis the delineation control information notified by the cell delineation control means.

According to an embodiment of the present invention, the cell delineation control means includes a table for storing CRC operating data for detecting the positions of cell headers corresponding to the respective input lines and for storing delineation state information, so that the cell delineation control means detects the positions of cell headers contained in respective data blocks read out from the buffer memory by using the CRC operating data read out from the table and detects the delineation states of the data blocks. Further, the cell delineation control means transits delineation states on the basis of the detected delineation states and the delineation state information read out from the table and controls transmission of data blocks (cell signals) to the output line in accordance with the delineation states.

According to another aspect of the present invention, the cell multiplexer comprises: a plurality of multiplexing units connected to a plurality of input lines, respectively; a selector means connected to the plurality of multiplexing units to make data blocks outputted from the multiplexing units pass selectively; a cell delineation control means for detecting cell delineation states of respective data blocks supplied from the selector unit and generating delineation control information in accordance with a result of the detection; and an output control means for designating multiplexing units to output data blocks in a predetermined sequence, and notifying the multiplexing units of delineation control information received from the cell delineation control means; and wherein each of the multiplexing units includes a multiplexing means for multiplexing ATM cell signals inputted through the plurality of input lines, a buffer memory for storing the ATM cell signals temporarily, a write control means for storing the ATM cell signals outputted from the multiplexing means in the buffer memory successively correspondingly to the lines, and a read control means for reading the ATM cell signals stored in the buffer memory in the form of data blocks each constituted by a predetermined number of bytes correspondingly to the lines, wherein the read control means determines read beginning addresses to read data blocks nextly correspondingly to the lines.

According to a further aspect of the present invention, the cell multiplexer comprises a multiplexing means for multiplexing signals inputted through a plurality of input lines, a memory for storing the input signals temporarily, a write control means for storing the input signals outputted from the multiplexing means in the memory correspondingly to the input lines, a read control means for reading the input signals stored in the memory in the form of data blocks each constituted by a predetermined number of bytes correspondingly to the input lines, a cell delineation control means for detecting the delineation state of each of the data blocks read from the memory, notifying the read control means of control information in accordance with a result of the detection and transmitting data blocks synchronized with the predetermined cell structure to the output line selectively, and a conversion means for converting the respective data blocks read from the memory into cells each having a predetermined structure to transmit the cells to the output line and notify the control information to the read control means, wherein the read control means selectively supplies data blocks read from the memory to either means selected from the delineation means and the conversion means in accordance with signal transmission protocol in the respective subscriber lines and determines read beginning addresses to read next data blocks correspondingly to the input lines on the basis of the control information notified by the cell delineation means and the conversion means.

According to the present invention, one cell delineation circuit can be used so as to be common to a plurality of lines and, accordingly, a buffer memory and a memory controller constituted by a write control portion and a read control portion as described above can be used so as to be common to the plurality of input lines, so that the cell multiplexer can be made small-sized.

BRIEF DESCRIPTION OF THE DRAWINGS

FIG. 7 is a diagram for explaining methods 1 to 3 employed in the present invention for controlling read beginning addresses to read data blocks for cell delineation;

FIG. 14 is a diagram for explaining the principle of the data-read beginning address control method 2;

FIG. 15 is a diagram showing the structure of the cell delineation control unit 4 for carrying out the data-read beginning address control methods 2 and 3

FIG. 16 is a diagram for explaining cell delineation table access timing in the data-read beginning address control method 2;

FIG. 17 is a diagram showing a second embodiment of the cell multiplexer according to the present invention;

FIG. 18 is a diagram showing a third embodiment of the cell multiplexer according to the present invention;

DESCRIPTION OF THE PREFERRED EMBODIMENTS

Figure 2:
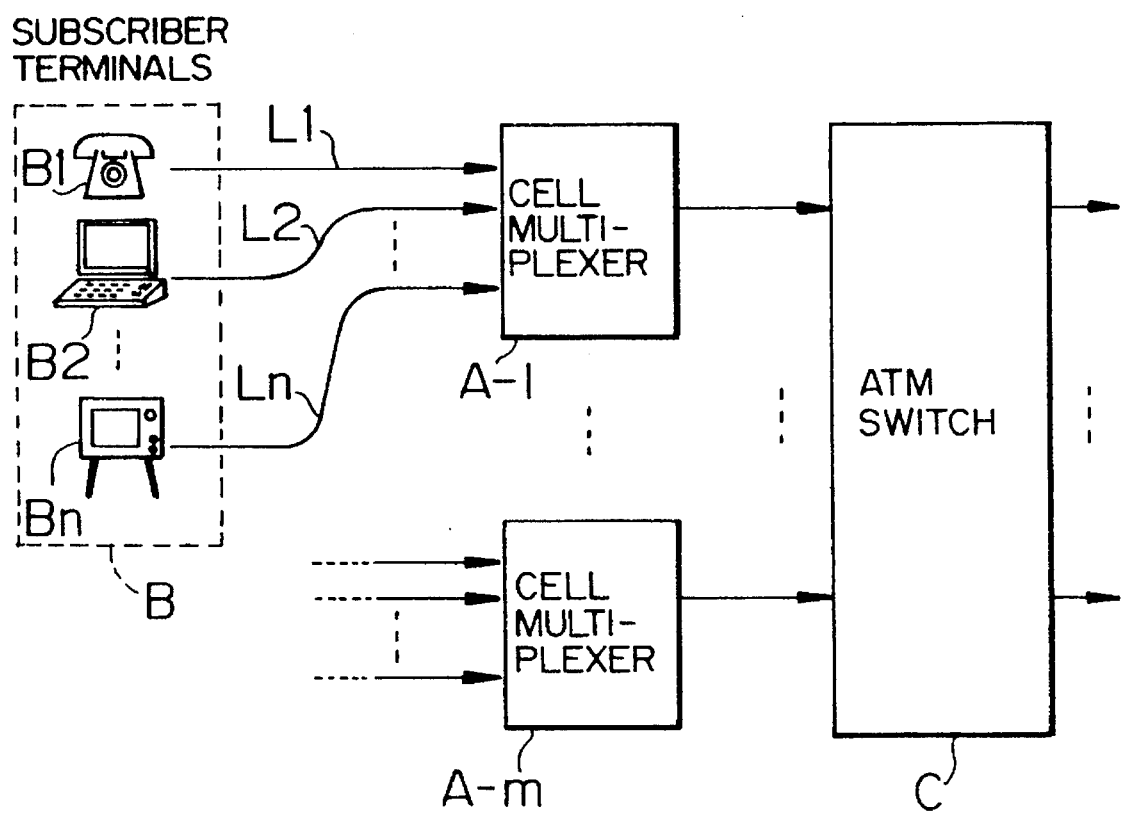
FIG. 2 is a diagram showing a network system to which the multiplexer according to the present invention is applied.

FIG. 2 shows an example of an ATM network system to which a cell multiplexer according to the present invention is applied.

In the drawing, the reference symbol A (A-1 to A-m) designate cell multiplexers, B subscriber terminals for transmitting/receiving information such as voice information, image information, data information, or the like, in the form of fixed-length packets (ATM cells) and C an ATM switch. If cell signals transmitted from terminals are inputted directly into the high-speed ATM switch C in the case where the bit rate in the subscriber terminals is as low as about 6.3 mega-bits per second, efficiency becomes very low. Therefore, generally cell signals from the plurality of subscriber terminals B are multiplexed by the cell multiplexers A so that resulting multiplex signals are inputted into the ATM switch C.

Figure 1:
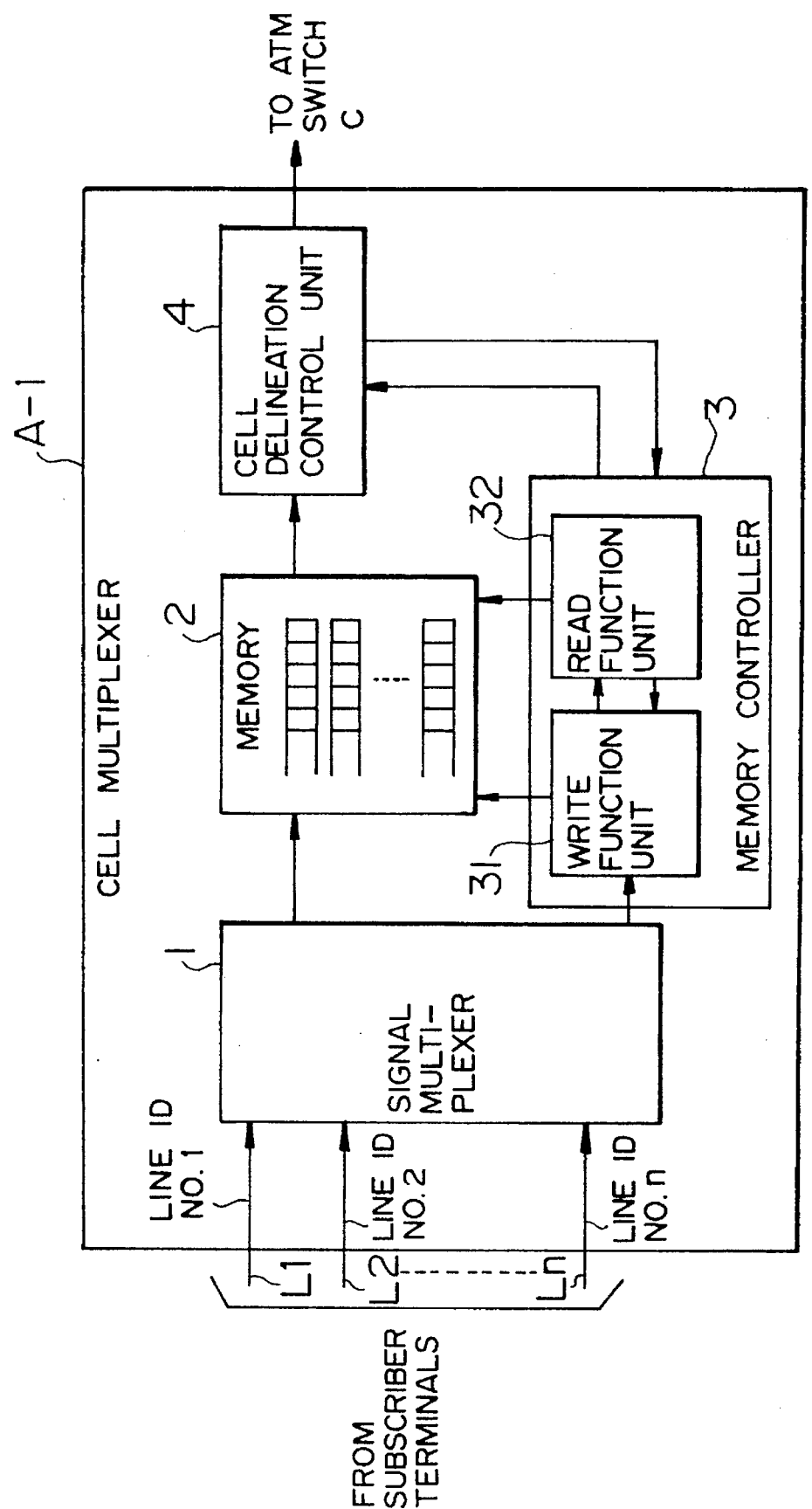
FIG. 1 is a functional block diagram showing an embodiment of a cell multiplexer according to the present invention.

FIG. 1 shows an example of the structure of a cell multiplexer A-1 according to the present invention.

The cell multiplexer A-1 comprises a signal multiplexer 1, a memory 2, a memory controller 3, and a cell delineation control unit 4.

The signal multiplexer 1 receives cell signals (cell data) transmitted from a plurality of subscriber terminals B, time-divisionally multiplexes these cell signals, for example, byte by byte and supplies the resulting multiplex signal to the memory (buffer memory) 2. Line identification numbers are given to input lines L (L1 to Ln) connected to the subscriber terminals so as to be peculiar to the input lines L, respectively. The signal multiplexer unit 1 has line interfaces (not shown) corresponding to the input lines. Time-division multiplex cell data supplied to the memory 2 are provided with line identification numbers assigned to the line interfaces, respectively.

Cell signals supplied from the signal multiplexer 1 to the memory 2 are stored in the memory 2 so that the cell signals are managed by a write function unit 31 of the memory controller 3 in the order of data arrival in accordance with the respective lines. This may be achieved by assigning predetermined-capacity buffer areas corresponding to the lines to write the cell signals in the buffer areas correspondingly to the input lines or by sharing the memory 2 to a plurality of lines in the form of a shared buffer in which addresses of cell signal storage areas are chained in accordance with the lines.

Figure 3:
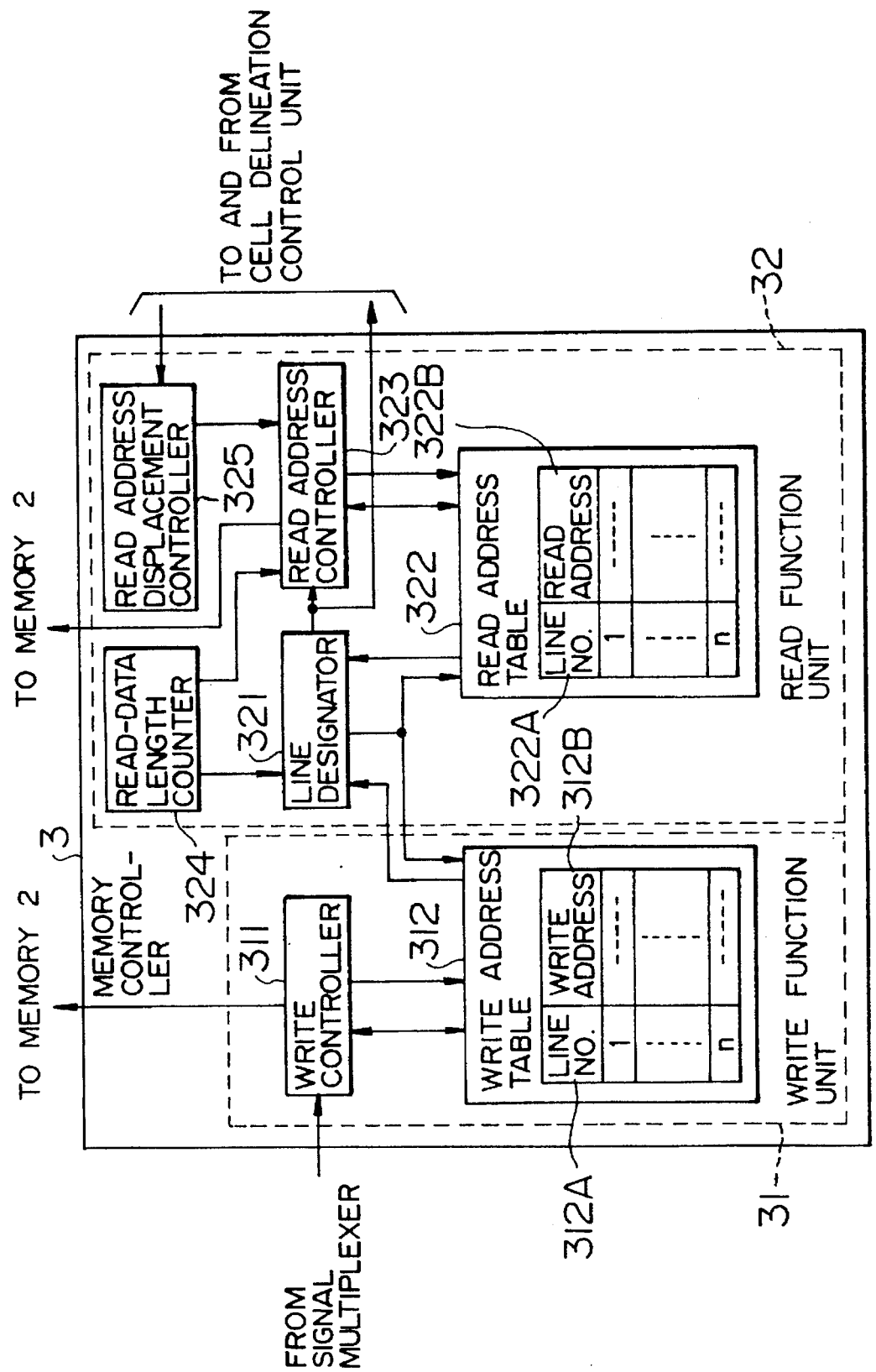
FIG. 3 is a diagram showing the structure of the memory controller 3 which is one of constituent elements of the multiplexer according to the present invention.

As shown in FIG. 3, the memory controller 3 includes a write function unit 31 for recording cell signals inputted by means of time-divisional multiplexing into the memory 2 in the form in which the order of arrival is managed correspondingly to the respective lines, and a read function unit 32 for reading the cell signals stored in the memory 2 successively from data-read beginning positions recorded correspondingly to the respective lines in advance and transmitting one-cell data blocks to the respective lines successively.

The write function unit 31 has a write controller 311, and a write address table 312 which stores write addresses 312B of the memory 2 correspondingly to line identification numbers 312A.

A line identification number extracted by the signal multiplexer 1 is inputted to the write controller 311, so that a write address corresponding to the line identification number is read from the write address table 312. A cell signal supplied from the signal multiplexer 1 to the memory 2 is written into a position indicated by the write address. Whenever a cell signal is written, the value of the write address is updated so that a next cell signal which will come through one and the same line is written in a position continued to the write position of the current cell signal, and this value is stored in a corresponding write address 312B within the write address table 312.

The read function unit 32 has a line designator 321, a read address table 322 for storing read beginning addresses 322B to begin reading of data blocks correspondingly to the line identification numbers 322A, a read address controller 323, a read-data length counter 324, and a read address displacement controller 325.

The line designator 321 checks the read address table 322 and the write address table 312 while circulatively changing the line identification number to read the cell signal, obtains the quantity of data stored in the memory 2 on the basis of difference between the write address 312B and the read address 322B in each line, finds line identification numbers permitting cell signals to be read and notifies the line identification numbers to the read address controller 323. Reading of cell signals is carried out with respect to the line in which the data block size reaches a value designated by the read-data length counter 324.

The read address controller 323 picks out a read beginning address 322B corresponding to the line identification number designated by the line designator 321 from the read address table 322, reads data of a block size designated by the read-data length counter 324 from the memory 2 by using the read address as the top of the data block and transmits the data to the cell delineation control unit 4. When a data block is read from the memory 2, a corresponding line number is notified to the cell delineation control unit 4 from the line designator 321.

The read address displacement controller 325 determines a read beginning position to read the next data block in a corresponding line after one-block data are read from the memory 2. The read beginning address to read the next data block is determined in accordance with the cell delineation state of the precedingly read data block, so that the displacement of the address is obtained in accordance with the cell delineation state signal given from the cell delineation control unit 4 and is given to the read address controller 323.

The read address controller 323 adds the aforementioned displacement to the current read address stored in the read address table 322 and stores the resulting address as the next read beginning address in the read address table 322.

The following describes the cell delineation state in the ATM network.

Figure 4:
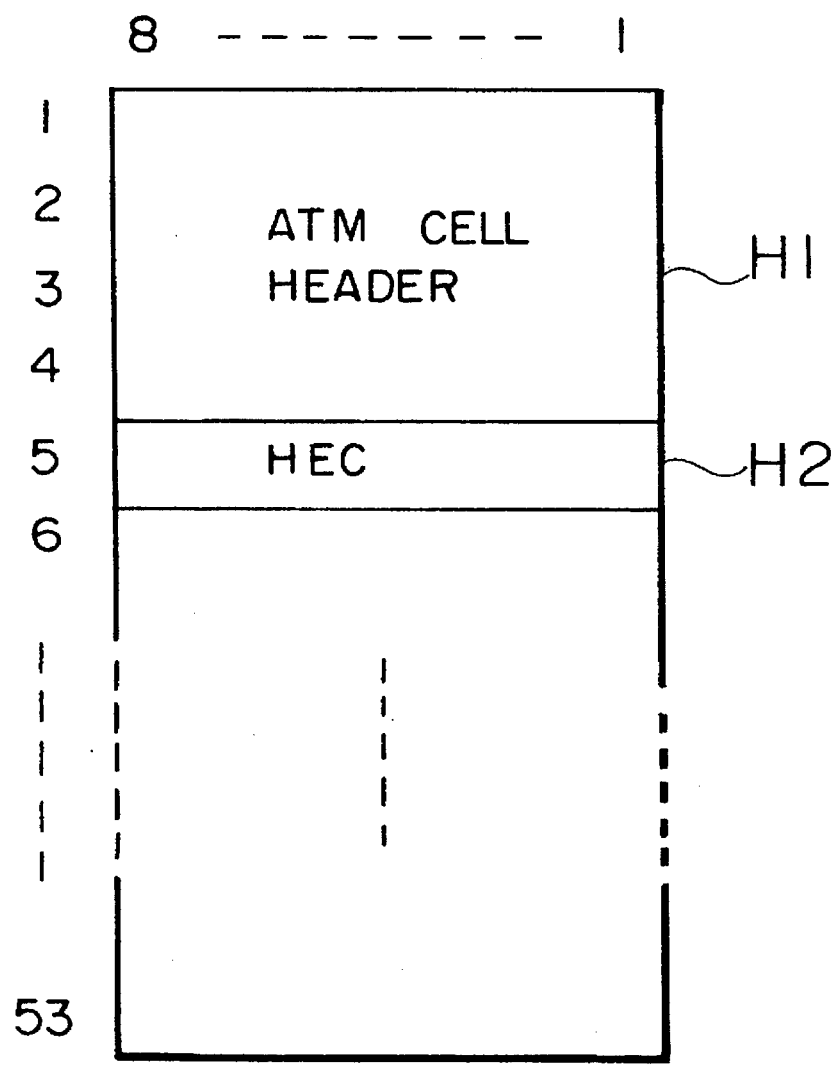
FIG. 4 is a diagram showing the format of an ATM cell.

To make the state of a data block read from the memory 2 a "cell delineation" state coincident with the ATM cell structure, it is necessary to detect the header error check (HEC) portion of the ATM cell. The HEC portion is provided for detection of the top of the ATM cell constituted by a 53-byte fixed-length data block, error detection and error correction in the cell header, and so on. For example, as shown in FIG. 4, the ATM cell has an ATM cell header H1 with a size of 4 bytes at the top of the cell. A CRC operation result obtained with respect to this cell header H1 is set in the fifth byte of each cell as the HEC portion H2.

Figure 5:
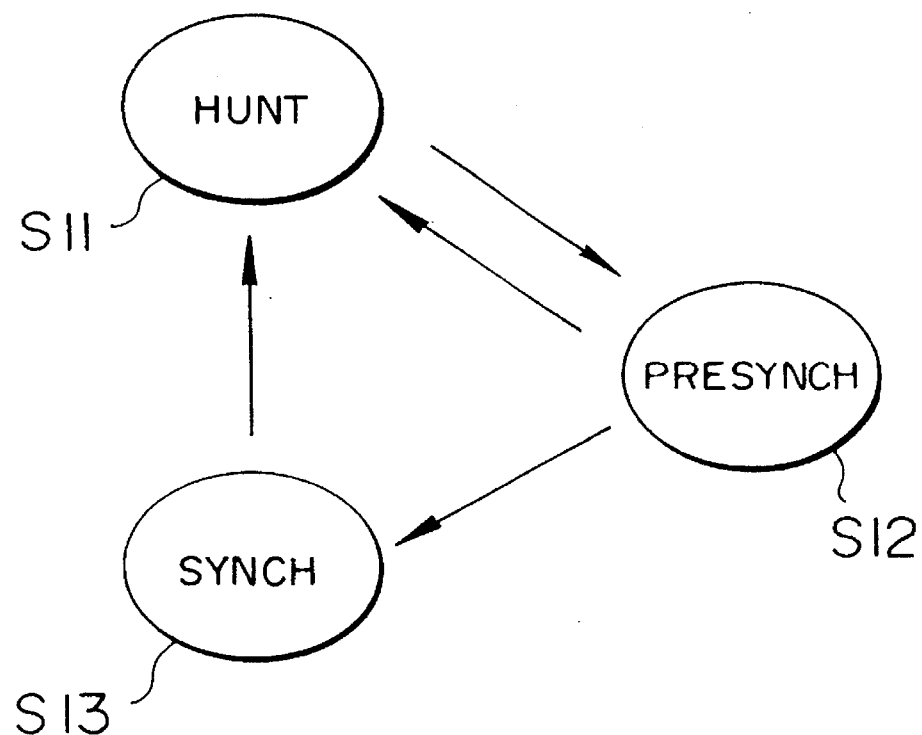
FIG. 5 is a diagram of transition of cell delineation state in the ATM.
Figure 6:
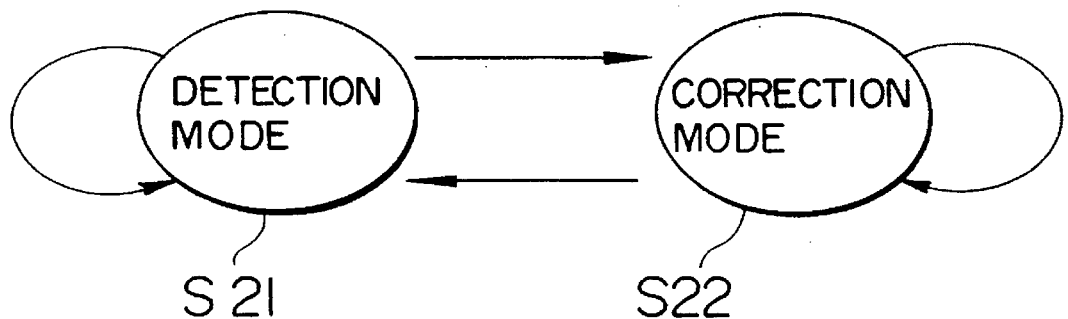
FIG. 6 is a diagram of transition of cell delineation state in the ATM.

FIGS. 5 and 6 show the transition of cell delineation state.

The cell delineation state is internationally standardized in accordance with CCITT 1.432.

"HUNT" S11 shown in FIG. 5 represents a hunting state in which there is no HEC portion detected. When some HEC portion is detected in this state, the state is transitted to a "PRESYNCH" state S12.

As long as the state is "PRESYNCH" S12, there is monitored whether the next HEC portion is located in a position (expected position) one-cell distant from the detected HEC position or not. When the next HEC portion cannot be detected in the expected position, the state is transitted to the "HUNT" state S11 again.

When the next HEC portion can be detected in the expected position, the monitoring of the HEC portion is performed continuously in the same manner as described above so that the number of times of continuous detections is measured as the number of protection stages. When the number of protection stages exceeds a predetermined threshold value, the delineation state is transitted to the "SYNCH" state S13.

As long as the state is "SYNCH" S13, there is monitored whether the HEC portion is located in a position one-cell distant from the detected HEC position or not, in the same manner as in the "PRESYNCH" state S12. When the next HEC portion cannot be detected, the monitoring of the HEC portion is continued so that the continuous non-detection number of times is measured as the number of protection stages. When the number of protection stages exceeds a predetermined threshold value, the delineation state is transitted to the "HUNT" state S11.

"Detection Mode" S21 shown in FIG. 6 is a mode in which error correction is not carried out even in the case where error is detected in the cell header. "Correction Mode" S22 shown in FIG. 6 is a mode in which error correction is carried out by using the HEC portion in the case where there is one-bit error in the header.

If there is no error in the cell header of a cell received in the "Detection Mode" S21, the mode is transitted to the correction mode S22. If there is contrariwise some error detected even in one bit of the cell header of a cell received in the correction mode S22, the mode S21 is transitted to the detection mode S21 (after error correction in the case of one-bit error). These "Detection Mode" and "Correction Mode" have a relation with idle cell generation control which will be described later.

FIG. 7 shows relations between data block size designated by the read-data length counter 36 and the read beginning address of the next data block determined by the address displacement controller 325 in accordance with the cell delineation state.

In FIG. 7, there are shown three embodiments of methods 1, 2 and 3 different in combination of the data block size and the read beginning address.

In the method 1, the data block size designated by the read-data length counter 324 is made to be 53 bytes equal to the length of one ATM cell and, in the case where the cell delineation state is either "HUNT" S11 or "SYNCH" S13, the read address displacement for designating the read beginning position to read the next data block is made to be 53 bytes (equal to the length of one cell). In the case where the cell delineation state is "PRESYNCH" S12, the read address displacement is made to be h+53 bytes when the displacement from the top of the read data block to the top of the cell is h bytes. The top of each cell is 4 bytes short of the detected HEC portion H2.

In the aforementioned "PRESYNCH" state S12, the following two cases are thought of.

The first case is the case where there is some difference between the top of the cell and the top of the data block read from the memory 2 (equivalent to the read beginning address to read the data block from the memory 2) just after the state is transitted from the "HUNT" state S11 to the "PRESYNCH" state S12, that is, the case of h≠0. The second case is the case where the "PRESYNCH" state S12 has been continued several times so that the top of the cell coincides with the top of the read data block, that is, the case of h=0.

In either of the aforementioned cases, a position one-cell (53 bytes) distant from the top (the h-th byte position from the read beginning address to read the data block) of the detected cell can be used as a read beginning address to read the next data block.

The address displacement controller 325 obtains address displacement for designating the read beginning address to read the next data block in each of the lines on the basis of the cell delineation state (S11 to S13) notified by the cell delineation control unit 4 and the value indicating the relative position of the HEC portion in the data block read precedingly.

In the method 2, the data block size designated by the read-data length counter 324 is made to be 53 bytes equal to the length of one ATM cell, so that when the cell delineation state is "HUNT" S11, the read beginning address to read the next data block is updated to a value shifted by 49 bytes from the current value so that the last 4 bytes of the data block read out precedingly are contained in the leading portion of the next data block to be read out. When the cell delineation state is "PRESYNCH" or "SYNCH", the read beginning address to read the next data block is updated in the same manner as in the method 1.

In the method 3, for convenience of cell processing in other circuits connected as posterior stages, data blocks are read out so that the top of the cell is located in the m-th byte position from the top of each of the data blocks read out from the memory. When, for example, the data block size designated by the read-data length counter 324 is 57 bytes which is larger than the length (53 bytes) of one ATM cell, the read beginning address to read the next data block is updated to the (h−m+53)-th byte position from the top of the preceding data block in a period in which the cell delineation state is "PRESYNCH", in which: h represents the leading position of the cell in the preceding data block; and m represents the target position for the top of the cell in the next data block, each of h and m having a value equivalent to displacement (the number of bytes) from the leading position of the data block. For example, the value of m is selected from integers of "1" to "5".

Figure 8:
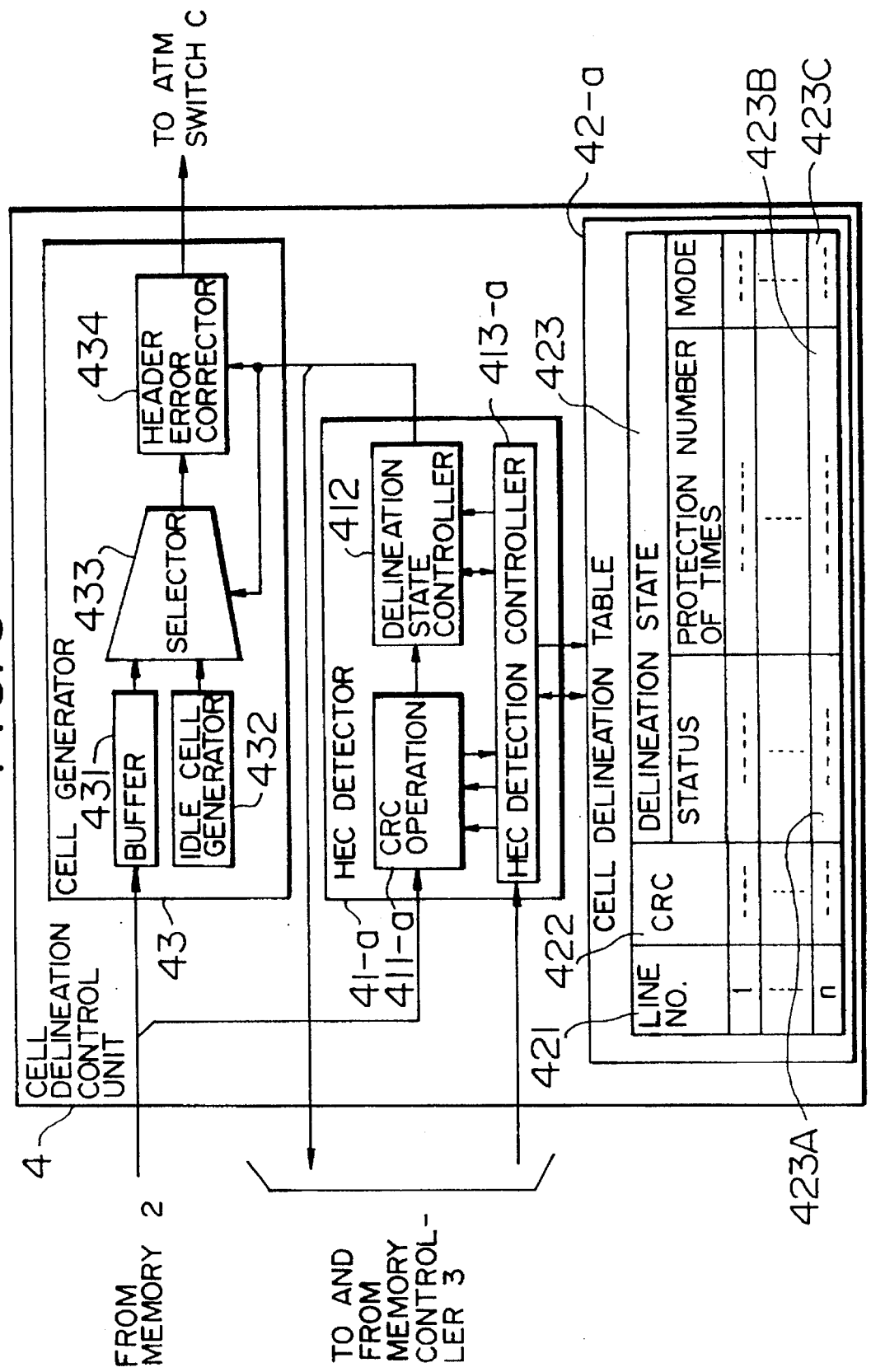
FIG. 8 is a diagram showing the structure of the cell delineation control unit 4 for carrying out the data-read beginning address control method 1.

FIG. 8 is a functional block diagram of the cell delineation control unit 4 for performing cell delineation in accordance with the method 1. The cell delineation control unit 4 includes an HEC detector 41-*a*, a cell delineation table 42-*a*, and a cell generator 43.

The HEC detector 41-*a* which is provided for detecting the position of the HEC portion of an ATM cell, is constituted by a CRC (cyclic redundancy check) operator 411-*a*, a delineation state controller 412 and an HEC detection controller 413-*a*.

The HEC detection controller 413-*a* performs controlling of the CRC operator 411-*a* and the delineation state controller 412 and performs accessing of the cell delineation table 42-*a* which will be described later.

Because the HEC portion H2 of an ATM cell indicates a result of the CRC operation of the ATM cell header H1 having a length of 4 bytes as shown in FIG. 4, it is necessary for detection of the HEC portion H2 that continuous 5-byte data are inputted to the HEC detector 41-*a* and that verification is made as to whether a result of the CRC operation of 4-byte data of from the first byte to the fourth byte coincides with the value of the fifth byte or not.

Figure 9:
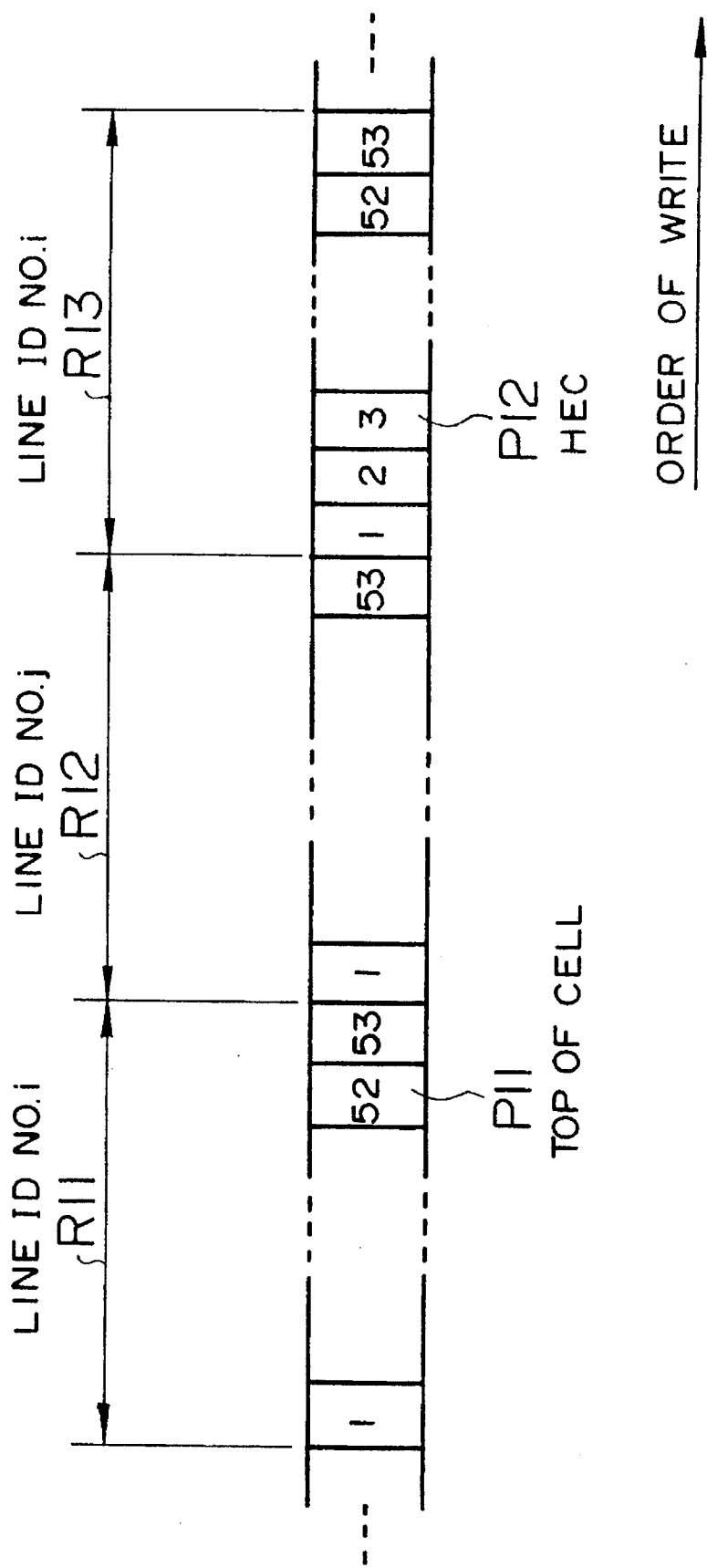
FIG. 9 is a diagram for explaining the principle of the data-read beginning address control method 1.

FIG. 9 shows positional relations between data block and top of cell in two lines identified by line ID Nos. i and j, respectively, in the case where cell signal data blocks are read out from the memory 2 in order of a data block R11 of line ID No. i, a data block R12 of line ID No. j and a data block R13 of line ID No. i as a simple example.

Pay attention to the cell signal of line ID No. i, now. Assume that the top of the cell is located in the 52nd byte (P11) from the leading position of the data block when the first data block R11 is read out. Because the HEC portion H1 is located so as to be shifted by 4 bytes from the top of the cell, the HEC portion H1 of the cell is located in the third byte P12 from the leading position of the data block R13 which is to be read out next. It is necessary that the HEC detector 41-*a* can detect the HEC portion H1 even in the case where a cell header is read out over two data blocks as described above.

Figure 10:
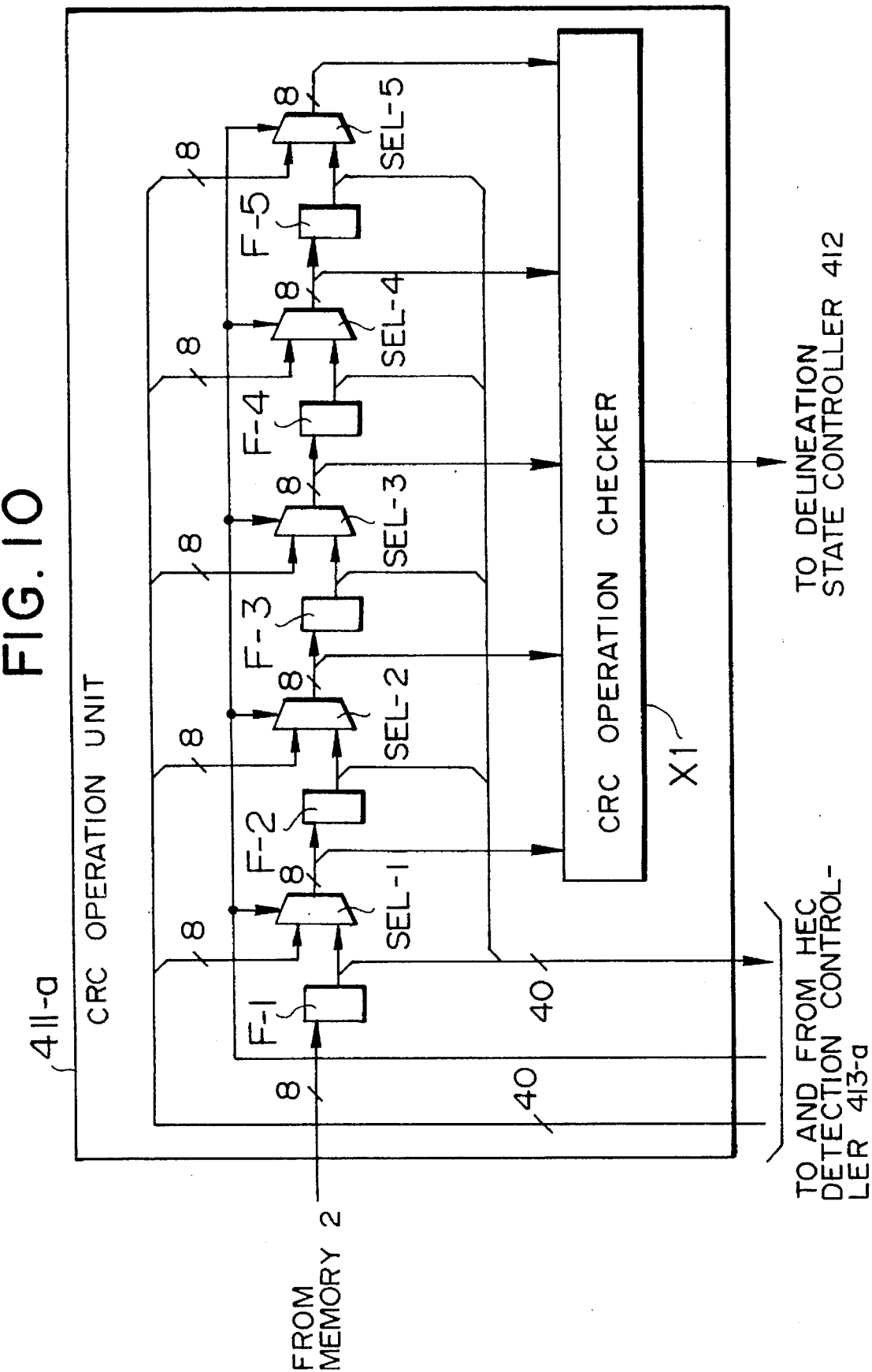
FIG. 10 is a diagram showing an embodiment of the CRC operation unit 411-a.

As shown in FIG. 10, the CRC operator 411-*a* has: a shifter F composed of five flip-flop circuits F-1, F-2, F-3, F-4 and F-5 which are tandem connected to one another and operate so that 8-bit cell signal data read out byte by byte from the memory 2 are transferred to the rear stage successively; and a CRC operation checker X1 receiving respective outputs of the flip-flop circuits and performing CRC operation on the basis of continuous five-byte data.

The CRC operation checker X1 carries out an HEC detecting operation on the basis of the CRC operation value generated at a point of time when four-byte data equivalent to the ATM cell header H1 are inputted to the flip-flop circuits F-2 to F-5 and the data value of the HEC portion H2 following the cell header as inputted to the flip-flop circuit F-1 and outputs a control signal indicating a result of the detection.

When only one line is a subject of the HEC detection, the CRC operator 411-*a* carries out the CRC operation of four-byte data while supplying input signals to the shifter F (flip-flop circuits F-1 to F-5) successively to thereby retrieve a position in which the value of the CRC operation coincides with the last byte data (HEC). When cell signals inputted through a plurality of lines are used as shown in FIG. 2, it is however necessary that a storage area for holding values (trains of input data) to be set to the flip-flop circuits and state data generated on the basis of these input data trains as "CRC operating data" correspondingly to the respective lines is prepared in advance so that an operation of holding CRC operating data on the way of processing and an operation of calling in the preceding CRC operating data in a line to be subjected to processing are carried out whenever a data block is switched to a new one, for example, as R11 is switched to R12 or as R12 is switched to R13 as in FIG. 9.

Referring back to FIG. 8, the cell delineation table 42-*a* stores CRC operating data 422 and delineation state information 423 correspondingly to the respective line identification numbers 421. The delineation state information 423 contains status 423A indicating any one of "HUNT" state S11, "PRESYNCH" state S12 and "SYNCH" state S13 shown in FIG. 5, protection number of times 423B in "PRESYNCH"/"SYNCH", and mode 423C indicating either "Detection Mode" S21 or "Correction Mode" S22 shown in FIG. 6.

For example, at a point of time when the reading of the data block of line ID No. j is completed and the data block of line ID No. i is to be read out from the memory 2, the HEC detection controller 413-a saves the CRC operating data and the delineation state with respect to line ID No. j onto the cell delineation table 42-a and reads out the CRC operating data with respect to line ID No. i from the cell delineation table 42-a to thereby set a train of data to the flip-flop circuits in the CRC operator 411-a. Accordingly, the leading data of a new data block read out from the memory 2 is supplied to the respective flip-flop circuits of the CRC operator 411-a so as to follow the last data of the preceding data block.

From the aforementioned reason, the CRC operator 411-a has selectors SEL-1 to SEL-5 on the output side of the flip-flop circuits F-1 to F-5 as shown in FIG. 10. Each of the selectors SEL-1 to SEL-5 selects either data outputted from the preceding-stage flip-flop circuit or data given from the HEC detection controller 413-a in accordance with the control signal generated from the HEC detection controller 413-a and supplies the selected data to the CRC operation checker X1 and the next-stage flip-flop circuit. The input selection of the selectors SEL-1 to SEL-5 controlled by the HEC detection controller 413-a will be described later with reference to FIG. 11 which is a time chart of a sequence.

The delineation state controller 412 performs management of state transition among states S11, S12 and S13 shown in FIG. 5, management of protection number of times in "PRESYNCH" state S12 and "SYNCH" state S13 and management of state transition between "Detection Mode" S21 and "Correction Mode" S22 shown in FIG. 6.

When the data block (cell signal) of line ID No. i is read out from the memory 2, the HEC detection controller 413-a transfers the delineation state 423 of line ID No. i read out from the cell delineation table 42 to the delineation state controller 412. The delineation state controller 412 transits the delineation state on the basis of the delineation state 423 received from the HEC detection controller 413-a and the control signal given from the CRC operator 411-a.

When the data block read out from the memory 2 is switched from line ID No. i to line ID No. i, the delineation state stored in the delineation state controller 412, as well as the aforementioned CRC operating data, is held in the line ID No. i record of the cell delineation table 42-a. In this occasion, the delineation state and a header error correction signal are transmitted from the delineation state controller 412 to the cell generator 43 whereas the delineation state and a signal indicating the position of the HEC portion H2 are transmitted from the delineation state controller 412 to the memory controller 3. As a result, the read address displacement explained above with reference to FIG. 7 is controlled.

The cell generator 43 has a buffer 431 for storing cell signals read out from the memory 2 temporarily, an idle cell generator 432, a selector 433 for selecting either cell outputted from the buffer 431 or idle cell generated by the idle cell generator 432, and a header error corrector 434 for correcting error when error occurs in the header of the cell passing through the selector 433.

The cell generator 43 operates to suppress the data block (cell signal) read out from the memory 2 from being transmitted to the output line and transmit the idle cell generated by the idle cell generator 432 to the output line by controlling the selector 433 on the basis of a control signal issued by the HEC detector 41 in accordance with the state of the fifth-byte data (HEC portion H2) in each data block (ATM cell) in a period of "HUNT" state S11 or "PRESYNCH" state S12 or when incorrectable error is detected in the header in the "SYNCH" state S13.

When there is no error in the header in the "SYNCH" state S13, the cell signal read out from the memory 2 is made to pass. When there is some correctable error in the header H1 in the "SYNCH" state S13, error correction is performed by operating the header error corrector 434 and then the cell signal is transmitted to a cell processing circuit.

The buffer 431 is provided to temporarily buffer cell signals read out from the memory 2 until a control signal comes from the HEC detector 41-a, that is, the buffer 431 outputs input cell signals successively in the form of FIFO (first-in first-out).

Figure 11:
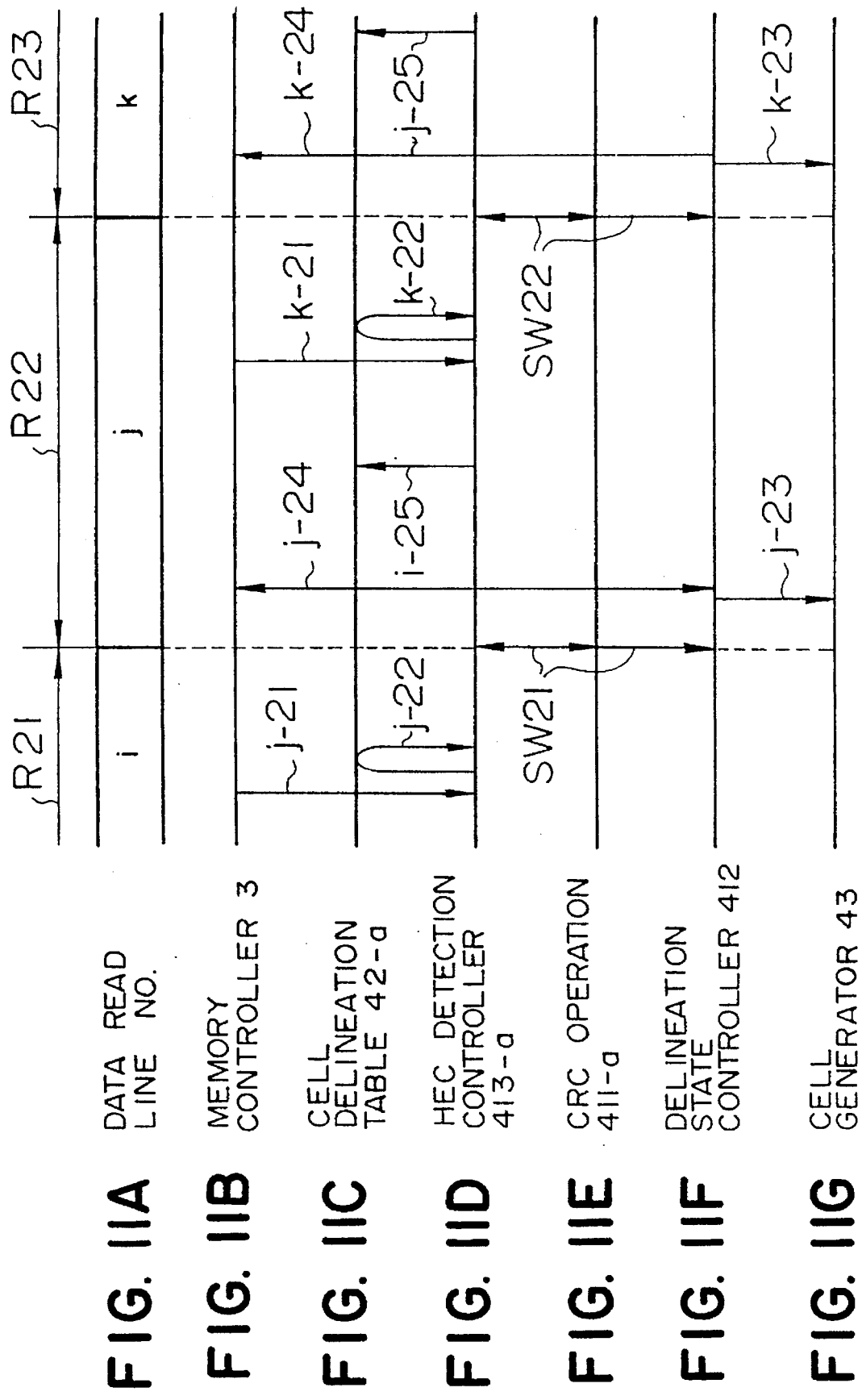
FIG. 11 is a diagram showing an operation sequence in the data-read beginning address control method 1.

FIG. 11 shows a cell delineation control sequence using the method 1 at the time of the reading of a cell signal R22 of line ID No. i in the case where data blocks (cell signals) R21, R22 and R23 received from line ID Nos. i, j and k are to be read out from the memory 2 successively.

While the data block R21 of line ID No. i is read out from the memory 2, a signal indicating the line ID No. j of the next data block to be read out is transmitted from the memory controller 3 to the HEC detection controller 413-a (j-21). The HEC detection controller 413-a reads out CRC operating data 422 and delineation state information 423 concerned with the line ID No. j from the cell delineation table 42-i aon the basis of the aforementioned signal (j-22).

The HEC detection controller 413-a switches the selectors SEL-1 to SEL-5 to set CRC operating data (a train of data in the last portion of the preceding data block) concerned with line ID No. j and having been already read out from the cell delineation table 42-a to the flip-flop circuits F-1 to F-5 at the timing of the leading of data block R22 when the data block to be read out from the memory 2 is switched from data block R21 of line ID No. i to data block R22 of line ID No. j. At this point of time, the HEC detection controller 413-a holds a train of data of line ID No. j fetched from the respective flip-flop circuits temporarily. The train of data is stored as CRC operating data 422 of line ID No. i in the cell delineation table 42-a in suitable timing (i-25) in a period in which the next data block R22 is processed.

In the timing in which the first data in the next data block R22 is read out, the selectors SEL-1 to SEL-5 are switched. Thereafter, respective byte data in the data block R22 are inputted to the flip-flop circuits F-1 to F-5 successively. With respect to the delineation state information 423, the delineation state information of the preceding line ID No. i is fetched from the delineation state controller 412 into the HEC detection controller 413-a and held temporarily in the same manner as the CRC operating data and the delineation state of the next line ID No. j already read out from the cell delineation table 42-a is set to the delineation state controller (SW21).

While the data block R22 of line ID No. j is read out, the output signal of the CRC operator 411-a is fetched into the delineation state controller 412 whenever each byte data is supplied from the memory 2.

The delineation state controller 412 supplies the delineation state and a control signal for header error correction to the cell generator 43 (j-23) and supplies a signal indicating the position of the HEC portion H2 to the memory controller 3 (j-24). Further, the CRC operating data 422 and delineation state information 423 of line ID No. i which have been held at the point of time of switching data blocks are stored in the cell delineation table 42-a (i-25).

The memory controller 3 notifies a signal indicating the next line ID No. k to the HEC detection controller 413-a on the way of reading of the data block R22 (k-21) in the same manner as the memory controller 3 notifies the next line ID No. j on the way of reading of the data block R21.

The HEC detection controller 413-*a* reads out CRC operating data 422 and delineation state information 423 concerned with line ID No. k from the cell delineation table 42-*a* in response to the notification of the line identification number (k-22).

At the point of time when the data block R22 is switched over to R23, the delineation state of the preceding line ID NO. j is fetched from the delineation state controller 412 into the HEC detection controller 413-*a*, so that the delineation state of the next line ID No. k is set to the delineation state controller. Further, the CRC operating data is fetched from the CRC operator to the HEC detection controller 413-*a*, so that the train of data in the flip-flop circuits is replaced by a new data train (SW 22). Then, the delineation state and a control signal for header error correction are supplied from the delineation state controller 412 to the cell generator 43 (k-23), the delineation state and a signal indicating the position of the HEC portion are supplied to the memory controller 3 (k-24), and the delineation state of line ID No. j held temporarily and the CRC operating data in the last portion of the preceding data block R22 are stored in the cell delineation table 42-*a* (j-25). Thus, cell delineation processing of the data block of line ID No. j is completed.

Incidentally, the cell delineation table 42-*a* may be designed so that data reading and data writing are performed once in a period in which a data block having a length of one cell is read out from the memory 2.

Because a cell signal, for example, having a transmission bit rate of 155.52 mega-bits/sec can be processed in the cell delineation control unit 4 as long as the aforementioned table is accessed in a period of about 2.7 microseconds per cell, the cell delineation table 42-*a* does not require any particularly high-speed memory.

Figure 12:
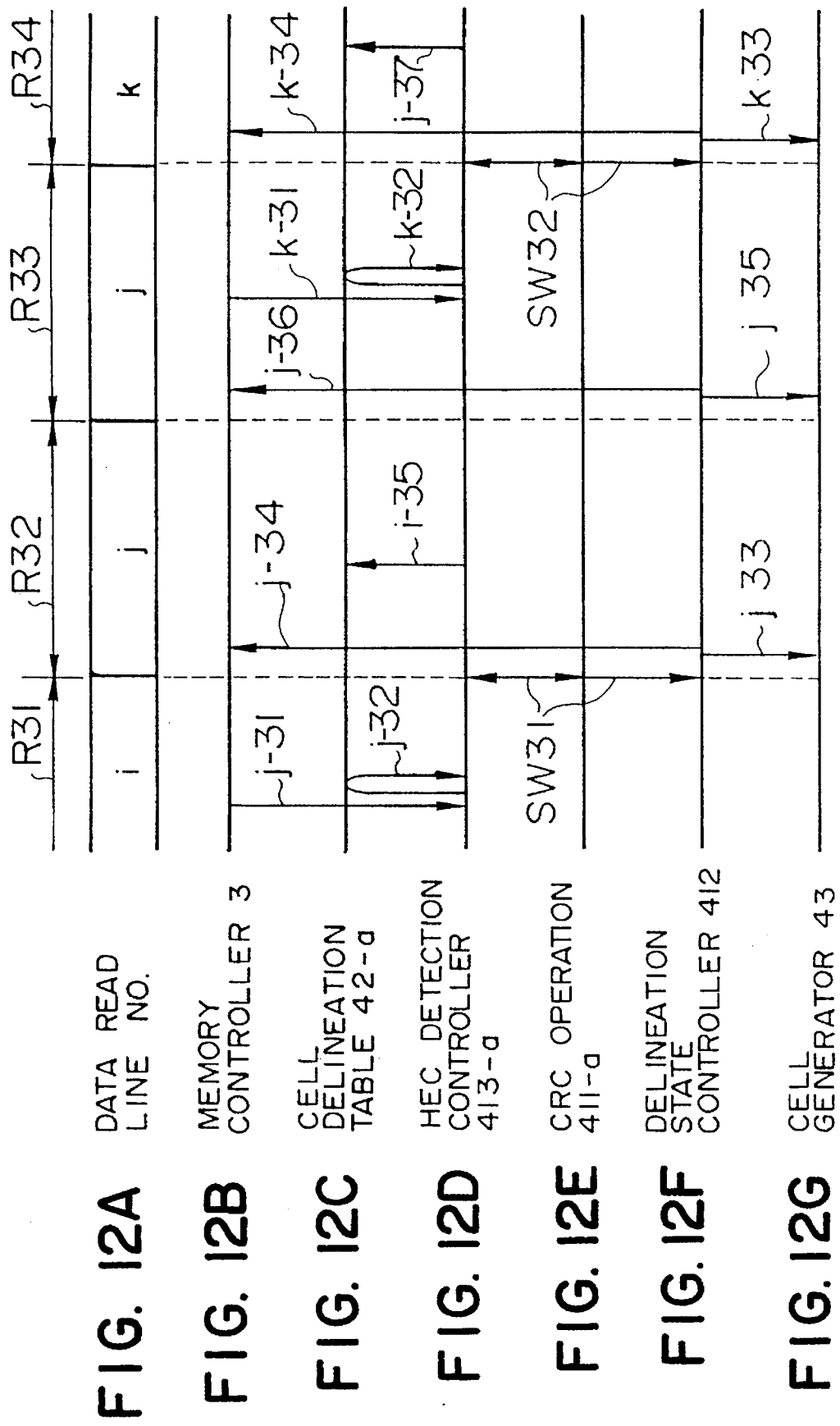
FIG. 12 is a diagram showing an operation sequence in a modified example of the data-read beginning address control method 1.

FIG. 12 shows a sequence in the case where data blocks equivalent to a plurality of cells (in this example, two cells) corresponding to each line are continuously read out from the memory 2 by using the method 1.

In a period in which a data block R31 of line ID No. i is read out from the memory 2, the line ID No. j of the next data block to be read out is notified to the HEC detection controller 413-*a* by the memory controller 3 (j-31). Upon reception of the notification of the line identification number, the HEC detection controller 413-*a* reads CRC operating data 422 and delineation state information 423 concerned with the line ID No. j from the cell delineation table 42-*a* (j-32).

When the data block R31 is switched over to R32, the HEC detection controller 413-*a* fetches the CRC operating data and delineation state of the line ID No. i from the CRC operator 411-*a* and the delineation state controller 412, respectively, and sets the CRC operating data and delineation state of the line ID No. j to the CRC operator 411-*a* and the delineation state controller 412, respectively, in the same manner as in the example shown in FIG. 11 (SW 31).

In a period in which the data block R32 of the line ID No. j is supplied byte by byte, the HEC detection controller 413-*a* fetches the output of the CRC operator 411-*a* and detects the HEC portion whereas the delineation state controller 412 gives the delineation state and a control signal for header error correction to the cell generator 43 (j-33) and gives the delineation state and a signal indicating the position of the HEC portion to the memory controller 3 (j-34). Further, the CRC operating data 422 and the delineation state 423 obtained with respect to the data block R32 of the preceding line ID No. i are held in the cell delineation table 42-*a* (i-35).

When a data block R33 following the data block R32 is to be read out through one and the same line ID No. j, the memory controller 3 omits the notification of the line identification number to the HEC detection controller 413.

When there is no notification of the line identification number from the memory controller 3, the HEC detection controller 413 omits signal transmission between the CRC operator 411-*a* and itself and between the delineation state controller and itself, and then, as for new data block R23, carries out procedures j-35 and j-36 in the same manner as the procedures j-33 and j-34.

When the notification of the next line identification number from the memory controller 3 is omitted in a period in which the data block R32 is read out, the HEC detection controller 413 omits the operation of reading the CRC operating data and delineation state from the cell delineation table 42-*a* and holding the CRC operating data and delineation state concerned with the preceding data block in the table at the time of the switching of data blocks.

Before the data block R34 of line ID No. k is read out from the memory 2, the memory controller 3 notifies the line ID No. k to the HEC detection controller 413 (k-31). The HEC detection controller 413 reads the CRC operating data 422 and delineation state information 423 of line ID No. k from the cell delineation table 42-*a* and holds the CRC operating data and delineation state information of line ID No. j in the table in the same manner as in the case of the data block R31 (k-32).

At a point of time when the data block R33 is switched over to the data block R34, the HEC detection controller 413-*a* receives the CRC operating data and delineation state of line ID No. j from the CRC operator 411-*a* and the delineation state controller 412, and sets the CRC operating data and delineation state of line ID No. k in place of those of the line ID No. j, to the CRC operator 411-*a* and the delineation state controller 412, respectively (SW32).

Then, the delineation state and a control signal for header error correction are supplied from the delineation state controller 412-*a* to the cell generator 43 (k-33) and the delineation state and a signal indicating the position of the HEC portion are supplied from the delineation state controller 412-*a* to the memory controller 3 (k-34). Further, the CRC operating data and delineation state information of line ID No. j which have been held in the last of the data block R33 are stored in the cell delineation table 42 in suitable timing (j-37).

The following describes the methods 2 and 3. These methods are designed so that the holding of CRC operating data corresponding to the respective lines in the cell delineation table can be omitted.

In the method 2, the read beginning address to read the next data block is shifted by 49 bytes from the leading position of the preceding data block if the delineation state is "HUNT" state S11 at the point of time when the reading of a data block of 53 bytes is completed.

Figure 13:
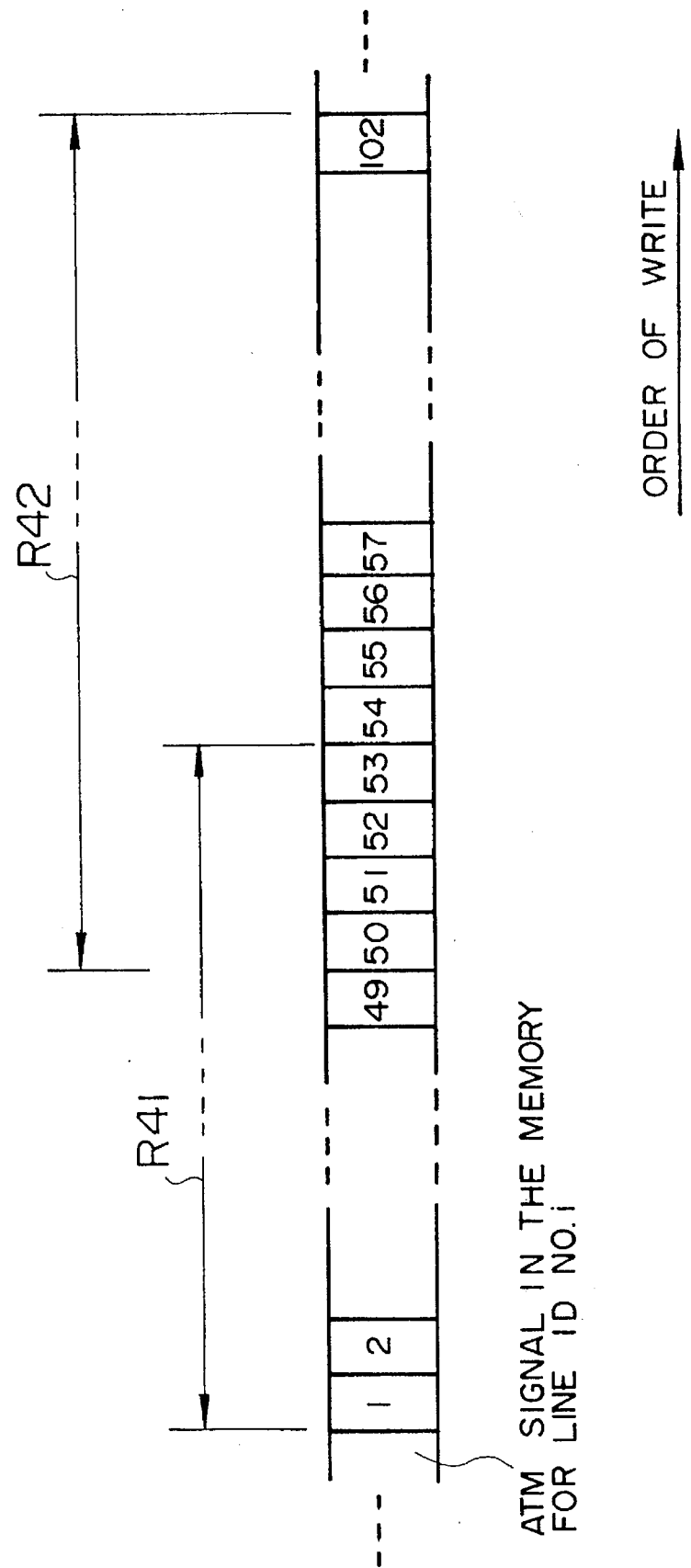
FIG. 13 is a diagram for explaining the principle of the data-read beginning address control method 2.

FIG. 13 shows the relation between a data block in a "HUNT" state S11 and a read beginning position to read the next data block in cell signals of line ID No. i. Assume that cell signals of line ID No. i are rightwise written in the memory 2 successively in order of arrival.

Assume now that the delineation state is "HUNT" state S11 at a point of time when a data block R41 constituted by 53 bytes of from data (1) to data (53) has been completely read out from the memory 2. In this case, the read beginning address to read the next data block is updated to a value 49 bytes distant from the leading address of the preceding data block as defined in FIG. 7.

In this example, the next data block R42 is constituted by 53 bytes of from data (50) to data (102) so that 4 bytes of from data (50) to data (53) are read out as an overlapping portion between the preceding data block and the next data block.

For HEC detection, it is necessary that the 4-byte header and the 1-byte HEC are continuously inputted to the HEC detector. Even in the case where the boundary between data blocks to separate data blocks from each other is created in the aforementioned 5-byte portion, the HEC can be detected by using the CRC operating data of the preceding data block in the same manner as in the method 1 as long as the CRC operating data of the preceding data block is held correspondingly to each line.

If the HEC position of a data block separated by an arbitrary boundary is to be detected upon the assumption that the holding of CRC operating data is omitted, it is however necessary that the block boundary is set so that the 5 bytes constituted by a header H1 and an HEC H2 exist always continuously in each data block.

When, for example, the HEC H2 is located in between data (54) and data (57) in the case where the reading of the data block R42 in FIG. 13 is started from data (54), it is impossible to detect the HEC. When the cell header H1 coupled with the HEC is located in between data (50) and data (53), it is likewise impossible to detect the HEC.

The method 2 is designed so that even in the case where the top of a cell is located in between data (50) and data (53), the leading 5 bytes of the cell can be continuously inputted to the HEC detection controller 413-a by setting the block boundary so as to make the last 4 bytes of the preceding data block R41 overlap the next data block R42.

When the HEC H2 can be detected in a data block read out in a "HUNT" state S11, the state is transitted to a "PRESYNCH" state S12 and, as shown in FIG. 7, the address is updated so that the read beginning address to read the next data block coincides with the top of the cell. That is, when the top of the cell in a data block in which the HEC has been detected is located in a position $h$ bytes distant from the top of the block, a value obtained by adding (h+53) bytes to the data block read beginning address stored in the read address table 322 is preferably stored in the address table 322 as the read beginning address to read the next data block.

While the delineation state is "SYNCH" state S13, the read beginning address to read the next data block is updated by 53 bytes and the updated address is stored in the read address table 322. In the "PRESYNCH" state S12 or "SYNCH" state S13, the duplicated reading of one and the same data as required in the "HUNT" state S11 is not required as long as whether or not the HEC H2 is detected just after the 4-byte header H1 is monitored, because the top of the data block coincides with the top of the cell when cell delineation is established.

In the method 3, the size of each data block read out from the memory 2 is made 57 bytes and, in the case where the delineation state is "PRESYNCH" state S12 at a point of time when the reading of the data block is completed, the read beginning address to read the next data block is updated so that the top of the cell in the data block which is to be read next is located in the m-th byte position ($\underline{m}$ is a constant having a value of from "1" to "5") from the top of the data block.

FIG. 14 shows an example of setting of the read beginning address to read the next data block in accordance with the method 3 in the case where the delineation state is "SYNCH" state S13 or "HUNT" state S11.

Assume that the delineation state is "SYNCH" or "HUNT" at a point of time when the reading, from the memory 2, of a data block R51 of line ID No. $\underline{i}$ constituted by 57 bytes of from data (1) to data (57) is completed. In this case, the address to read the next data block R52 is located in a position 53 bytes distant from the top of the preceding data block R51. Accordingly, the next data block R52 is constituted by 57 bytes of from data (54) to data (106) so that the last 4 bytes of from data (54) to data (57) in the preceding data block R51 are read out again as the top of the next data block R52. By controlling the read beginning address to read the next data block as described above, the HEC H2 which cannot be detected in the block R51 because the top of the cell is located in between data (54) and data (57), can be detected in the next block R52 securely.

According to the method 3, in the "SYNCH" state S13, the top of the cell is always located in the m-th byte position from the top of each data block. Accordingly, a portion having a length of one cell from the m-th byte position of each data block is preferably extracted as an ATM cell by the header error corrector 434 so as to abort an unnecessary portion.

FIG. 15 is a functional block diagram of the cell delineation control unit 4 which performs cell delineation in accordance with the method 2 or 3.

Like the apparatus configuration shown in FIG. 8, the structure shown in FIG. 15 is composed of an HEC detector 41-b, a cell delineation table 42-b, and a cell generator 43.

Structural difference from the apparatus shown in FIG. 8 is in the following two points: (a) the cell delineation table 42-b has no area for storing CRC operating data 422; and (b) a CRC operator 411-b in the HEC detector 41-b operates so as to be independent from an HEC detection controller 413-b.

In the methods 2 and 3, the header H1 and the HEC H2 are contained in each data block so as to be continuous, so that the CRC operator 411-b need not hold CRC operating data of the preceding data block temporarily. Further, the HEC detection controller 413-b need not transfer CRC operating data between the CRC operator 411-b and itself as long as it performs a controlling operation between the delineation state controller 412 and itself.

· FIG. 16 shows the relation between the reading of data from the memory 2 and the detection of the HEC H2 in the method 2.

Assume now that a data block R62 of line ID No. $\underline{j}$ is to be read out from the memory 2 after a data block R61 of line ID No. $\underline{i}$ is read out. Assume further that a point of time when the HEC detection controller 413 can detect the HEC is P61 in the case where the HEC is located in byte data (53) in the data block R61, and that a point of time when the HEC detection controller 413 can detect the HEC is P62 in the case where the HEC is located in byte data (5) in the data block R62.

Because the HEC detector 41-b in the method 2 cannot detect the HEC unless a cell signal in each line is inputted so that 5 bytes or more are continuous, the HEC H2 cannot be detected in between the leading byte (1) of the data block R62 and byte (4) even in the case where the HEC H2 exists in between byte (1) and byte (4). That is, the HEC cannot be detected in a period of from the point of time P61 to the point of time P62 where switching of data blocks occurs intermediately. In the case where the method 2 is employed, therefore, the cell delineation table 42 is preferably accessed in a period of from P61 to P62 to carry out the operation of reading/writing delineation state information 423 as represented by i-61 and j-61. The same thing can be applied to the method 3.

FIG. 17 shows a second embodiment of the cell multiplexer according to the present invention.

In this embodiment, a plurality of input lines connected to a cell multiplexer A-1 are divided into n groups so that multiplexer units M-i (i=1 to n) each including a signal multiplexer 1-i (i=1 to n), a memory 2-i (i=1 to n) and a memory controller 3-i (i=1 to n) are provided for the groups, respectively. The outputs of the multiplexer units are inputted to a selector 6. A cell delineation control unit 4 is connected to the output side of the selector 6. The multiplexer units M-i (i=1 to n) and the selector 6 are controlled by a cell multiplexing controller 5.

Each of the signal multiplexers 1-i performs time-divisional multiplexing of cell signals received from qi (qi is a natural number) lines of from line ID No. i-1 to line ID No. i-qi and supplies the multiplex signal to a corresponding memory 2-i so that the cell signals are managed correspondingly to the lines in the same manner as in the case of FIG. 1 so that the cell signals are written and read out block by block for every line by a write function unit 31-i and a read function unit 32-i constituting the memory controller The cell multiplexing controller 5 selects the multiplexer units M-1 to M-n successively so that when, for example, a multiplexer unit M-i is selected, a selection signal is given to a corresponding memory controller 3-i. In response to the selection signal, the memory controller 3-i reads one-block data of a cell signal of line ID No. i-j (1≦j≦qi) byte by byte from the memory 2-i successively and gives the data to the selector 6. In this occasion, the memory controller 3-i notifies the selector 6 of the line ID No. i-j of the data block to be read out.

The selector 6 selects the output of the memory 2-i on the basis of the control signal given from the cell multiplexing controller 5, so that the line identification number and data outputted from the memory 2-i are transferred to the cell delineation control unit 4.

The cell delineation control unit 4 operates in the same manner as the unit shown in FIG. 1 to feed delineation state information and a signal indicating the HEC position to the cell multiplexing controller 5. The cell multiplexing controller 5 transfers the information to the memory controller 3-i, which performs read control in the same manner as the memory controller 3 shown in FIG. 1.

FIG. 18 shows a third embodiment of the cell multiplexer according to the present invention.

Here, terminals B1 to Bn connected to subscriber lines L1 to Ln for the cell multiplexer A-1 include ATM terminals having a function of sending ATM cell signals, and terminals having a function of sending other signals than the ATM cell signals, such as telephones adapted to N-ISDN (Narrow Band Integrated Services Digital Network) for transmitting CBR (constant bit rate) line data.

Input signals from subscriber lines L1 to Ln are multiplexed by the signal multiplexer 1 and stored in a buffer formed in the memory 2 correspondingly to subscriber lines in the same manner as in the first embodiment of the present invention explained with reference to FIG. 1.

The cell multiplexer has not only the cell delineation control unit 4 but also an AAL1 (ATM Adaptation Layer 1) processing unit 7 as a unit for converting CBR line data read out from the memory 2 into ATM cells so that either the output of the cell delineation control unit 4 or the output of the AAL1 processing unit 7 is selectively sent out to the network through a cell signal selector 8. One of read address displacement control signals outputted from the cell delineation control unit 4 and the AAL1 processing unit 7 is supplied to the memory controller 3 through a selector 10.

Whether data read out from the memory 2 is to be processed by the cell delineation control unit 4 or whether the data is to be processed by the AAL1 processing unit 7 is designated by a service table 9 which stores service types 9B correspondingly to input line identification numbers 9A. As the service types, information for specifying the type (in this example, cell delineation or AAL1 processing) of a process to be applied to the data read out is stored. The service table 9 may be united with the read address table 322 shown in FIG. 3 so as to be referred to by the memory controller 3.

The memory controller 3 reads addresses 322B from the read address table 322 on the basis of line identification numbers switched circulatively. In this occasion, the line designator 321 shown in FIG. 3 reads the service type 9B from the service table to give a selection signal to the selectors 8 and 10 in accordance with the contents of the service type 9B and enables either the cell delineation control unit 4 or the AAL1 processing unit 7 to notify the line identification number.

When data is to be read out from the buffer storing ATM cell signals, the cell delineation control unit 4 is selected so that the cell multiplexer operates in the same manner as in the first embodiment.

When data is to be read out from the buffer storing CBR line data, the AAL1 processing unit 7 is selected so that ATM cells generated by the AAL1 processing unit 7 are sent out to the network (ATM switch) through the selector 8.

Figure 19A:
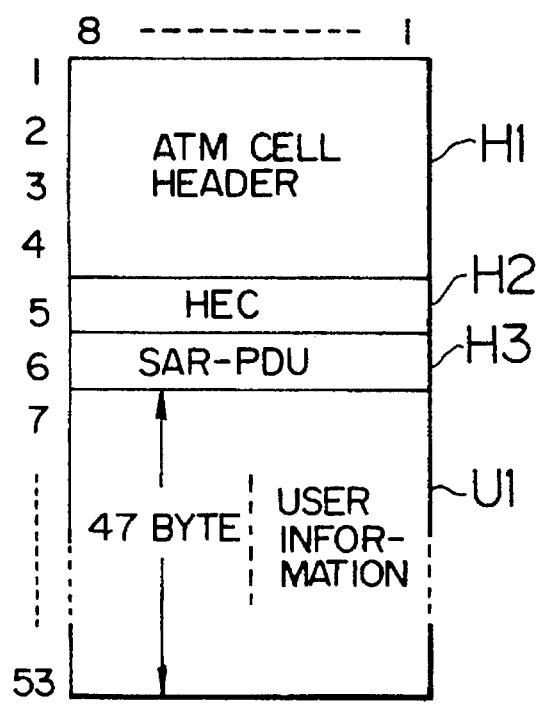
FIG. 19A is a diagram showing a first type cell structure generated by the aforementioned cell multiplexer.
Figure 19B:
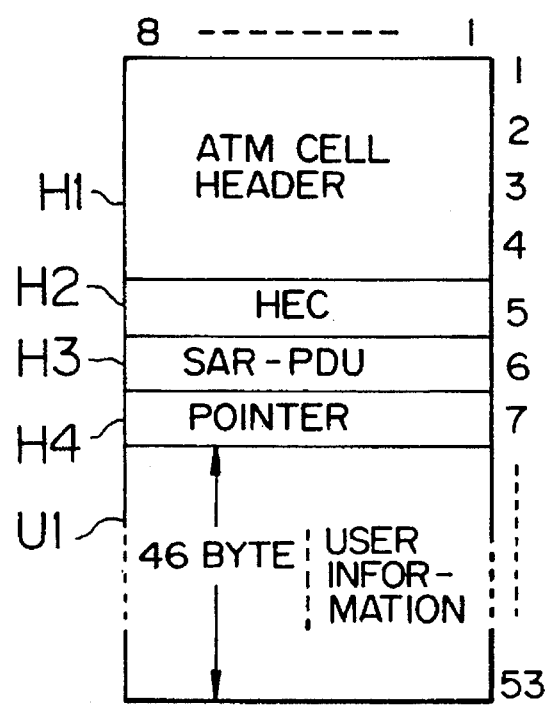
FIG. 19B is a diagram showing a second type cell structure generated by the aforementioned cell multiplexer.

ATM cells generated by the AAL1 processing unit 7 are classified into two types: the first type cell having an SAR-PDU (segmentation and reassembly protocol data unit) header H3 at the sixth byte, and a 47-byte user information area U1 following the header H3 as shown in FIG. 19A; and the second type cell having a header H3, a 1-byte pointer area H4 following the header H3, and a 46-byte user information area U1 following the pointer area H4 as shown in FIG. 19B.

Figure 19C:
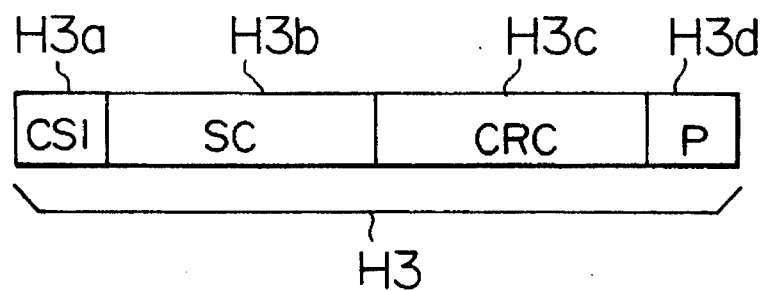
FIG. 19C is a diagram showing the contents of the sixth byte in each of the aforementioned cells.

Sequence numbers (repetition of 0, 1, 2, . . . 6, 7) indicating the order of generation of ATM cells inclusive of input data through one and the same line are set in the SAR-PDU header H3. Specifically, as shown in FIG. 19C, the sixth byte of each ATM cell contains a CSI (Convergence Sublayer Indication) field H3a, an SC (Sequence Counter) field H3b, a CRC (Cyclic Redundancy Check) field H3c indicating an error check code for these fields, and a parity bit (P) H3d. When, for example, the bit of the CSI field H3a in a cell specified by an even sequence number is "1", the bit "1" indicates that the seventh byte of the cell contains the pointer H4. When, for example, the bit is "0", the bit "0" indicates that the seventh byte of the cell contains user information.

If there is no specific designation in the service type 9B of the service table 9, the AAL1 processing unit 7 transmits the 4-byte ATM cell header H1 determined in accordance with each line in advance, the 1-byte HEC H2 and the SAR-PDU header H3 having a field H3c containing sequence numbers obtained by counting in accordance with the respective lines and a CS field H3a containing a bit "0" and then transmits the 47-byte data block U1 read out from the memory 2. In this occasion, the AAL1 processing unit 7 gives a control signal to the read address displacement controller 325 of the memory controller 3 so that the read beginning address to read the next data block is updated by 47 bytes.

When the service type 9B of the service table 9 designates AAL1 processing according to the structured data transfer method, this designation means that data structured in predetermined block size are stored in the memory 2. In this occasion, the AAL1 processing unit 7 generates the second type ATM cell containing pointer information indicating the boundary between data blocks at its seventh byte, in accordance with a predetermined rule.

Figure 20:
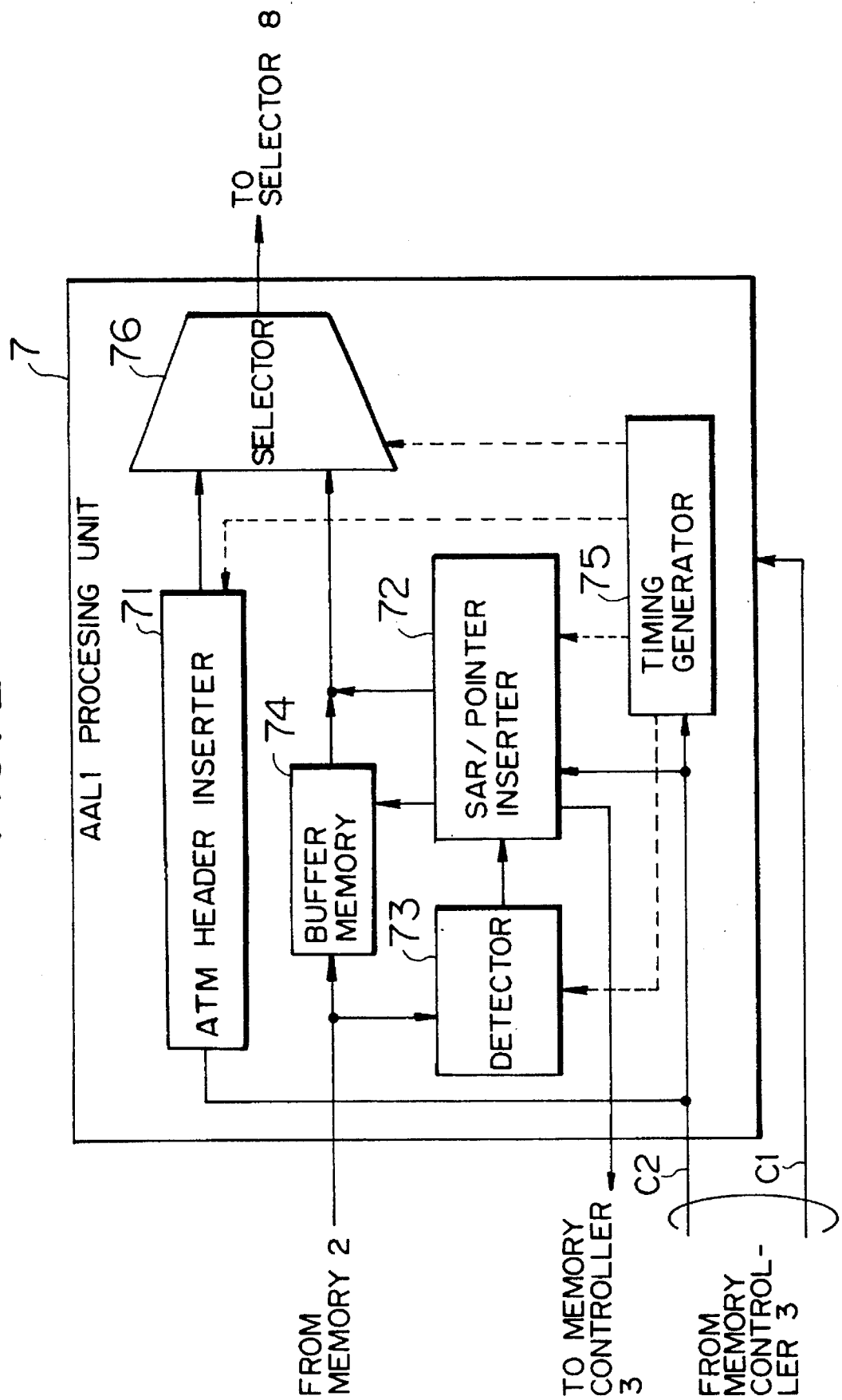
FIG. 20 is a diagram showing the detailed structure of the AAL1 processing unit depicted in FIG. 18.

FIG. 20 shows the structure of the AAL1 processing unit 7 which generates the first type and second type ATM cells as described above.

The AAL1 processing unit 7 has: an ATM header inserter 71 for generating a cell header (H1) and an HEC (H2) which are peculiar to each line; an SAR/ pointer inserter 72 for generating an SAR-PDU (H3) and a pointer (H4); a detector 73 for detecting the top of each data block transmitted by the structured data transfer method; a buffer memory 74 for temporarily storing data blocks read out from the memory 2; a timing generator 75 for generating a timing signal for controlling the operations of the aforementioned circuits; and a selector 76. The timing generator 75 starts its controlling operation on the basis of an enable signal given from the memory controller 3 through signal line C1.

The header inserter 71 stores the contents of ATM cell header (H1) and HEC (H2) correspondingly to line identification numbers in advance so that the header inserter 71 outputs an ATM cell header and an HEC specified by the line identification number notified by the memory controller 3 through signal line C2, in synchronism with the timing signal given from the timing generator 75.

Data received from lines subjected to structured data transfer are stored, together with bit information indicating the presence/absence of data block boundary, in the buffer of the memory 2. When data read out from the memory 2 are to be transferred to the buffer memory 74, the bit information is inputted to the detector 73 to thereby detect the leading position of each data block.

The SAR/pointer inserter 72 stores service type, sequence number and pointer control information correspondingly to each line identification number in advance so that in the case where the line identification number notified by the memory controller 3 through signal line C2 identifies a line of a general AAL1 mode, the SAR/pointer inserter 72 outputs the SAR-PDU header in timing given by the timing generator 75 and then makes data outputted from the buffer memory 74 successively to form the first type ATM cell as shown in FIG. 19A.

In the case where the notified line identification number identifies a line subjected to structured data transfer, the SAR/pointer inserter 72 generates pointer information to be set in the pointer area H4 in accordance with block leading position information detected by the detector 73. There is a preliminarily determined limitation for generation of ATM cells having the second type cell format as shown in FIG. 19B, so that the SAR/PDU inserter 72 is permitted to insert a pointer only in the case where the sequence number of the ATM cell is even. Further, when eight cells of from sequence number "0" to sequence number "7" are collected as one group, insertion of a pointer is permitted only once for one group. Accordingly, the SAR/pointer inserter 72 neglects other pointers after the pointer is inserted once, and generates the first type ATM cells.

If there is no block leading position found in one group, a dummy pointer is inserted in an ATM cell identified by sequence number "6". The SAR/ pointer inserter 72 supplies the memory controller 3 with control information determined in accordance with the presence/absence of pointer insertion. By the control information, the read beginning address to read the next data is determined in the memory controller 3 with either 46 bytes or 47 bytes as a displacement value.

As a modification of the third embodiment, a third conversion adapter for converting variable-length communication frames into ATM cells may be provided, as well as the cell delineation control unit 4 and the AAL1 processing unit 7, so that terminals for transmitting the variable-length communication frames are permitted to be connected to subscriber lines for the cell multiplexer.

We claim:

1. A cell multiplexer in which fixed-length cell signals provided in parallel from a plurality of input lines are stored in a buffer memory temporarily and then sent out to an output line in data blocks each having a form synchronized with a predetermined cell structure, said cell multiplexer comprising:

multiplexing means for multiplexing cell signals received from the plurality of input lines;

write control means for writing the cell signals outputted from said multiplexing means in said buffer memory successively correspondingly to the input lines:

read control means for reading the cell signals stored in said buffer memory from said buffer memory in data blocks each constituted by a predetermined number of bytes correspondingly to the input lines; and cell delineation control means for detecting a delineation state of each of the data blocks read from said buffer memory, notifying said read control means of delineation control information in accordance with a result of the detection and transmitting data blocks each having a form synchronized with said predetermined cell structure to the output line selectively, wherein said read control means determines read beginning addresses of data blocks to be read next correspondingly to respective input lines on the basis of the delineation control information notified by said cell delineation control means.

2. A cell multiplexer in which fixed-length cell signals provided in parallel from a plurality of input lines are stored in a buffer memory temporarily and then sent out to an output line in data blocks each having a form synchronized with a predetermined cell structure, said cell multiplexer comprising:

multiplexing means for multiplexing cell signals received from the plurality of input lines;

write control means for writing the cell signals outputted from said multiplexing means in said buffer memory successively correspondingly to the input lines:

read control means for reading the cell signals stored in said buffer memory from said buffer memory in data blocks each constituted by a predetermined number of bytes correspondingly to the input lines; and cell delineation control means for detecting a delineation state of each of the data blocks read from said buffer memory, notifying said read control means of delineation control information in accordance with a result of the detection and transmitting data blocks each having a form synchronized with said predetermined cell structure to the output line selectively, wherein said read control means determines read beginning addresses of data blocks to be read next correspondingly to respective input lines on the basis of the delineation control information notified by said cell delineation control means, wherein said cell delineation control means includes a memory for storing delineation states correspondingly to the input lines so that said cell delineation control means transits the delineation states stored in said memory correspondingly to relations between the cell delineation states detected in respective input data blocks and the delineation states stored in said memory and notifies delineation control information corresponding to said delineation states to said read control means.

3. A cell multiplexer according to claim 1, wherein said cell delineation control means transmits data blocks indicating idle cell signals instead of said input data blocks to the output line unless the delineation state corresponding to each of the input lines is synchronized with the predetermined cell structure.

4. A cell multiplexer according to claim 1, wherein said cell delineation control means performs delineation state control defined by Consultive Committee on International Telephone and Telegraph (CCITT) I.432 standard upon respective data blocks read from said buffer memory.

5. A cell multiplexer according to claim 1, wherein:

said cell delineation control means outputs information indicating the top of the cell detected in each of data blocks and the delineation state thereof as said delineation control information; and said read control means determines the read beginning addresses of data blocks to be read next correspondingly to the respective input lines, on the basis of the top of the cell and the delineation state.

6. A cell multiplexer in which fixed-length cell signals provided in parallel from a plurality of input lines are stored in a buffer memory temporarily and then sent out to an output line in data blocks each having a form synchronized with a predetermined cell structure, said cell multiplexer comprising:

multiplexing means for multiplexing cell signals received from the plurality of input lines;

write control means for writing the cell signals outputted from said multiplexing means in said buffer memory successively correspondingly to the input lines:

read control means for reading the cell signals stored in said buffer memory from said buffer memory in data blocks each constituted by a predetermined number of bytes correspondingly to the input lines; and cell delineation control means for detecting a delineation state of each of the data blocks read from said buffer memory, notifying said read control means of delineation control information in accordance with a result of the detection and transmitting data blocks each having a form synchronized with said predetermined cell structure to the output line selectively, wherein said read control means determines read beginning addresses of data blocks to be read next correspondingly to respective input lines on the basis of the delineation control information notified by said cell delineation control means;

wherein said cell delineation control means includes:

transfer means for transferring input data blocks to the output line, detection means for detecting cell delineation states on the basis of positions of cell headers contained in the data blocks, respectively, a memory for storing the delineation states correspondingly to the input lines, access means for accessing said memory, and state control means for determining delineation states to be stored in said memory correspondingly to relations between the cell delineation states detected by said detection means and delineation states of data blocks read from said memory by said access means correspondingly to the input lines and for controlling said transfer means in accordance with said determined delineation states.

7. A cell multiplexer according to claim 6, wherein said transfer means includes:

generation means for generating a data block indicating an idle cell; and selector means for selectively outputting either of an input data block and the idle cell generated by said generation means, said selector means being controlled by said state control means.

8. A cell multiplexer according to claim 7, wherein:

said cell delineation state detection means includes a header detection means for performing an error check code (CRC) operation with respect to a first data portion having a predetermined number of bytes equivalent to a continuous cell header in each data block and for detecting the position of the cell header on the basis of relations between said CRC and the content of a second data portion following said first data portion; and said access means includes means for storing the CRC operating data fetched from said header detection means at a point of time when a next data block is read from said buffer memory and for setting the CRC operating data read from said memory at a point of time when the next data block in a same input line is inputted from said buffer memory to said cell delineation control means.

9. A cell multiplexer according to claim 8, wherein said access means writes the CRC operating data fetched from said detection means into said memory in a period of a predetermined number of bytes after the leading byte of the next data block in a same input line is inputted to the cell delineation control means.

10. A cell multiplexer according to claim 1, wherein said read control means sets read beginning address to read a next data block to an address indicating a position distant by the length of one cell from a top of the preceding data block or indicating a position distant by a length different from the length of one cell from the top of the preceding data block in accordance with the delineation state indicated by said delineation control information.

11. A cell multiplexer according to claim 5, wherein said read control means sets read beginning address to read a next data block to an address determined on the basis of a leading position of the preceding data block and the top position and cell length of the cell detected in each data block when said delineation control information indicates a specific delineation state.

12. A cell multiplexer according to claim 5, wherein said read control means sets read beginning address to read a next data block to a position where the tail portion of a preceding data block will be read out again, when said delineation control information indicates a state in which the top of the cell has been not detected yet.

13. A cell multiplexer according to claim 12, wherein said read control means sets read beginning address to read a next data block to a position where the tail portion of a preceding data block will be read out by a predetermined number of bytes determined on the basis of the length of the cell header.

14. A cell multiplexer according to claim 1, wherein said read control means notifies a line identification number corresponding to a data block to be read out next to said cell delineation control means before the next data block is read out from said buffer memory.

15. A cell multiplexer in which fixed-length cell signals provided in parallel from a plurality of input lines are stored in a buffer memory temporarily and then sent out to an output line in data blocks each having a form synchronized with a predetermined cell structure, said cell multiplexer comprising:

multiplexing means for multiplexing cell signals received from the plurality of input lines;

write control means for writing the cell signals outputted from said multiplexing means in said buffer memory successively correspondingly to the input lines:

read control means for reading the cell signals stored in said buffer memory from said buffer memory in data blocks each constituted by a predetermined number of bytes correspondingly to the input lines; and cell delineation control means for detecting a delineation state of each of the data blocks read from said buffer memory, notifying said read control means of delineation control information in accordance with a result of the detection and transmitting data blocks each having a form synchronized with said predetermined cell structure to the output line selectively, wherein said read control means determines read beginning addresses of data blocks to be read next correspondingly to respective input lines on the basis of the delineation control information notified by said cell delineation control means;

wherein said read control means notifies a line identification number corresponding to a data block to be read out next to said cell delineation control means before the next data block is read out from said buffer memory;

wherein said read control means includes a read mode in which data blocks equivalent to a plurality of cells belonging to a same input line are continuously outputted from said buffer memory so that said read control means notifies a next line identification number to said cell delineation control means before reading of a next data block when the next data block to be read out from said buffer memory is different in input line from a preceding data block and that said read control means omits notification of a line identification number when a next data block belongs to a same input line as a preceding data block.

16. A cell multiplexer in which fixed-length cell signals given in parallel from a plurality of input lines are stored in a buffer memory temporarily and then sent out to an output line in data blocks each having a form synchronized with a predetermined cell structure, said cell multiplexer comprising:

a plurality of multiplexing units connected to a plurality of input lines, respectively;

selector means connected to said plurality of multiplexing units, for making data blocks outputted from said multiplexing units pass selectively;

cell delineation control means for detecting cell delineation states of respective data blocks supplied from said selector means, generating delineation control information in accordance with a result of the detection and transmitting data blocks each having a form synchronized with a predetermined cell structure to said output line selectively; and output control means for designating multiplexing units required to output cell signals in a predetermined sequence, wherein each of said multiplexing units includes:

multiplexing means for multiplexing cell signals received from the plurality of input lines, a buffer memory for storing the cell signals temporarily, write control means for writing the cell signals outputted from said multiplexing means in said buffer memory successively correspondingly to the input lines, and read control means for reading the cell signals stored in said buffer memory from said buffer memory in data blocks each constituted by a predetermined number of bytes correspondingly to the input lines, and wherein said read control means determines read beginning addresses of data blocks to be read next correspondingly to respective input lines on the basis of the control information notified by said output control means.

17. A cell multiplexer according to claim 16, wherein said cell delineation control means includes a memory for storing delineation states correspondingly to the input lines so that said cell delineation control means transits the delineation states stored in said memory on the basis of relations between the cell delineation states detected in respective input data blocks and the delineation states stored in said memory and generates delineation control information corresponding to said delineation states.

18. A cell multiplexer according to claim 16, wherein said cell delineation control means transmits data blocks indicating idle cell signals instead of input data blocks to the output line unless the delineation state corresponding to each of the input lines after transition is synchronized with the predetermined cell structure.

19. A cell multiplexer according to claim 16, wherein said cell delineation control means performs delineation state control defined by Consultive Committee on International Telephone and Telegraph (CCITT) I.432 standard upon respective data blocks read from said buffer memory.

20. A cell multiplexer according to claim 16, wherein:

said cell delineation control means outputs information indicating the top of the cell detected in each of data blocks and a delineation state thereof as said delineation control information; and said read control means determines the read beginning addresses of data blocks to be read next correspondingly to respective input lines, in accordance with the top of the cell and the delineation state.

21. A cell multiplexer according to claim 16, wherein said cell delineation control means includes:

transfer means for transferring input data blocks to the output line;

detection means for detecting cell delineation states on the basis of the positions of cell headers contained in the data blocks, respectively;

a memory for storing the delineation states correspondingly to the input lines;

access means for accessing said memory; and state control means for determining delineation states to be stored in said memory on the basis of relations between the cell delineation states detected by said detection means and delineation states of data blocks read from said memory by said access means correspondingly to the input lines and for controlling said transfer means in accordance with said determined delineation states.

22. A cell multiplexer according to claim 21, wherein said transfer means includes:

generation means for generating a data block indicating an idle cell; and selector means for selectively outputting either of an input data block and the idle cell generated by said generation means, said selector means being controlled by said state control means.

23. A cell multiplexer according to claim 21, wherein:

said cell delineation state detection means includes a header detection means for performing an error check code (CRC) operation with respect to a first data portion having a predetermined number of bytes equivalent to a continuous cell header in each data block and for detecting the position of a cell header on the basis of relations between said CRC and the content of a second data portion following said first data portion; and said access means includes means for storing the CRC operating data fetched from said header detection means at a point of time when a next data block is read from said buffer memory and for setting the CRC operating data read from said memory at a point of time when a next data block in a same input line is inputted from said buffer memory to said cell delineation control means.

24. A cell multiplexer according to claim 23, wherein said access means writes the CRC operating data fetched from said detection means into said memory in a period of a predetermined number of bytes after the leading byte of a next data block in a same input line is inputted to the cell delineation control means.

25. A cell multiplexer according to claim 16, wherein said read control means sets read beginning address to read a next data block to an address indicating a position distant by the length of one cell from the top of a preceding data block or indicating a position distant by a length different from the length of one cell from the top of the preceding data block in accordance with a delineation state indicated by said delineation control information.

26. A cell multiplexer according to claim 20, wherein said read control means sets read beginning address to read a next data block to an address determined on the basis of the leading position of a preceding data block and the top position and cell length of the cell detected in the data block when said delineation control information indicates a specific delineation state.

27. A cell multiplexer according to claim 20, wherein said read control means sets read beginning address to read a next data block to a position where the tail portion of a preceding data block will be read out again, when said delineation control information indicates a state in which the top of a cell has not been detected yet.

28. A cell multiplexer according to claim 27, wherein said read control means sets the read beginning addresses to read a next data block to a position where the tail portion of a preceding data block will be read out by a predetermined number of bytes determined on the basis of a length of the cell header.

29. A cell multiplexer according to claim 17, wherein said read control means notifies a line identification number corresponding to a data block to be read out next to said cell delineation control means before a next data block is read out from said buffer memory.

30. A cell multiplexer in which signals given in parallel from a plurality of input lines are stored in a buffer memory temporarily and then sent out to an output line in data blocks each having a form synchronized with a predetermined cell structure, said cell multiplexer comprising:

multiplexing means for multiplexing cell signals received from the plurality of input lines;

write control means for storing input signals outputted from said multiplexing means in said memory successively correspondingly to the input lines;

read control means for reading the input signals stored in said memory from said memory in data blocks each constituted by a predetermined number of bytes correspondingly to the input lines;

cell delineation control means for detecting the delineation state of each of the data blocks read from said memory, notifying said read control means of delineation control information in accordance with a result of the detection and transmitting data blocks each having a form synchronized with said predetermined cell structure to the output line selectively; and conversion means for converting the data blocks read from said memory into fixed-length cells each having the predetermined structure, transmitting said fixed-length cells to the output line and notifying control information to said read control means, wherein said read control means supplies data blocks read from said memory to either of said cell delineation control means and said conversion means selected in accordance with signal transmission protocol in respective subscriber lines and determines read beginning addresses of data blocks to be read next correspondingly to the respective input lines on the basis of delineation control information notified by said cell delineation control means and said conversion means.

31. A cell multiplexer according to claim 30, wherein:

fixed-length asynchronous transfer mode (ATM) cell signals or constant bit rate (CBR) signals are given through respective input lines; and said read control means supplies data blocks of ATM cell signals read from said buffer memory to said cell delineation control means and supplies data blocks of CBR signals read from said buffer memory to said conversion means.

32. A cell multiplexer according to claim 30, wherein said cell delineation control means has a memory for storing delineation states correspondingly to the input lines so that said cell delineation control means transits the delineation states stored in said memory on the basis of relations between the cell delineation states detected in respective input data blocks and the delineation states stored in said memory and generates delineation control information corresponding to said delineation states.

33. A cell multiplexer according to claim 30, wherein said cell delineation control means transmits data blocks indicating idle cell signals instead of said input data blocks to the output line unless delineation state corresponding to each of the input lines is synchronized with the predetermined cell structure.

34. A cell multiplexer according to claim 30, wherein said cell delineation control means performs delineation state control defined by Consultive Committee on International Telephone and Telegraph (CCITT) I.432 standard upon respective data blocks read from said buffer memory.

35. A cell multiplexer according to claim 30, wherein:

said cell delineation control means outputs information indicating the top of the cell detected in each of data blocks and a delineation state thereof as said delineation control information; and said read control means determines read beginning addresses of data blocks to be read next correspondingly to respective input lines, on the basis of the top of a cell and the delineation state.

36. A cell multiplexer according to claim 30, wherein said cell delineation control means includes:

transfer means for transferring input data blocks to the output line;

detection means for detecting cell delineation states on the basis of the positions of cell headers contained in the data blocks, respectively;

a memory for storing the delineation states correspondingly to the input lines;

access means for accessing said memory; and state control means for determining delineation states to be stored in said memory on the basis of relations between the cell delineation states detected by said detection means and delineation states of data blocks read from said memory by said access means correspondingly to the input lines and for controlling said transfer means in accordance with said determined delineation states.

37. A cell multiplexer according to claim 36, wherein said transfer means includes:

generation means for generating a data block indicating an idle cell; and selector means for selectively outputting either of an input data block and the idle cell generated by said generation means, said selector means being controlled by said state control means.

\* \* \* \* \*

UNITED STATES PATENT AND TRADEMARK OFFICE
CERTIFICATE OF CORRECTION

PATENT NO. :     5,570,368
DATED      :     October 29, 1996
INVENTOR(S):     M. Murakami, et al.

It is certified that error appears in the above-identified patent and that said Letters Patent is hereby corrected as shown below:

On the Title Page, left-hand column, before "[21] Appl. No.: 409,691", delete "[73] Assignee: Hitachi, Ltd., Tokyo, Japan" and insert --[73] Assignee: Hitachi, Ltd., and Hitachi ULSI Engineering Corporation, Tokyo, Japan --.

Signed and Sealed this

Ninth Day of December, 1997

Attest:

BRUCE LEHMAN

*Attesting Officer*         *Commissioner of Patents and Trademarks*